US011254799B2

(12) United States Patent
Kinloch et al.

(10) Patent No.: US 11,254,799 B2
(45) Date of Patent: Feb. 22, 2022

(54) GRAPHENE COMPOSITES

(71) Applicant: The University of Manchester, Manchester (GB)

(72) Inventors: Ian Kinloch, Manchester (GB); Robert Young, Manchester (GB); Lei Gong, Manchester (GB)

(73) Assignee: The University of Manchester, Manchester (GB)

( * ) Notice: Subject to any disclaimer, the term of this patent is extended or adjusted under 35 U.S.C. 154(b) by 24 days.

(21) Appl. No.: 14/376,049

(22) PCT Filed: Jan. 31, 2013

(86) PCT No.: PCT/GB2013/050215
§ 371 (c)(1),
(2) Date: Jul. 31, 2014

(87) PCT Pub. No.: WO2013/114116
PCT Pub. Date: Aug. 8, 2013

(65) Prior Publication Data

US 2014/0370269 A1 Dec. 18, 2014

(30) Foreign Application Priority Data

Jan. 31, 2012 (GB) ..................................... 1201649

(51) Int. Cl.

| | |
|---|---|
| ***C08J 3/20*** | (2006.01) |
| ***C08K 3/04*** | (2006.01) |
| ***C08K 3/30*** | (2006.01) |
| ***C08L 101/00*** | (2006.01) |
| ***C09C 1/44*** | (2006.01) |
| ***C09C 1/00*** | (2006.01) |

(52) U.S. Cl.
CPC ................ *C08K 3/04* (2013.01); *C08K 3/042* (2017.05); *C08K 3/30* (2013.01); *C09C 1/00* (2013.01); *C09C 1/44* (2013.01); *C01P 2002/82* (2013.01); *C08K 2003/3009* (2013.01); *Y10T 428/25* (2015.01); *Y10T 428/2982* (2015.01)

(58) Field of Classification Search
CPC .. C01B 31/0438–0492; C01B 2204/00; C01B 19/007; C08K 3/04; C08K 3/30; C08K 3/042
See application file for complete search history.

(56) References Cited

U.S. PATENT DOCUMENTS

| | | | | |
|---|---|---|---|---|
| 5,186,919 A * | 2/1993 | Bunnell | B02C 19/10 | 423/448 |
| 7,071,258 B1 * | 7/2006 | Jang | B82Y 30/00 | 423/445 B |
| 2008/0206124 A1 * | 8/2008 | Jang | B82Y 30/00 | 423/415.1 |
| 2008/0279756 A1 * | 11/2008 | Zhamu | C01B 32/225 | 423/448 |
| 2010/0000441 A1 * | 1/2010 | Jang | C09D 11/037 | 106/31.13 |
| 2010/0140792 A1 * | 6/2010 | Haddon | B82Y 30/00 | 257/713 |
| 2011/0037033 A1 * | 2/2011 | Green | B03D 3/00 | 252/510 |
| 2011/0046289 A1 | 2/2011 | Zhamu et al. | | |

FOREIGN PATENT DOCUMENTS

| | | | |
|---|---|---|---|
| JP | 2010-282729 A | 12/2010 | |
| JP | 2011-032156 A | 2/2011 | |
| JP | 2012-126827 A | 7/2012 | |
| WO | WO-2011/086391 A1 | 7/2011 | |
| WO | WO-2011081538 A1 * | 7/2011 | C10M 103/06 |
| WO | WO-2011/162727 A1 | 12/2011 | |
| WO | WO-2012/029946 A1 | 3/2012 | |

OTHER PUBLICATIONS

Zhou et al., A Mixed-Solvent Strategy for Efficient Exfoliation of Inorganic Graphene Analogues, Angew. Chem. Int. Ed., 2011, 50, Sep. 27, 2011, pp. 10839-10842. (Year: 2011).*
Coleman et al., Two-Dimensional Nanosheets Produced by Liquid Exfoliation of Layered Materials and supplement, Science vol. 331, Feb. 4, 2011, pp. 568-571 and supplement pp. 1-36. (Year: 2011).*
Saha et al., Phonons in few layer graphene and interplanar interaction: A first-principles study, Angew. Chem. Int. Ed. 2011, 50, pp. 10839-10842 (Year: 2011).*
Chen et al., Three-dimensional flexible and conductive graphene networks grown by chemical vapour deposition, Nature Materials, vol. 10, Jun. 2011, pp. 424-428. (Year: 2011).*
Bertolazzi, S. et al., "Stretching and Breaking of Ultrathin $M0S_2$," ACS NANO, vol. 5, No. 12, pp. 9703-9709 (Dec. 27, 2011).
International Search Report and Written Opinion for International Application No. PCT/GB2013/050215 dated Mar. 26, 2013 (15 pgs.).
Kun, P. et al., "Determination of structural and mechanical properties of multilayer graphene added silicon nitride-based composites," Ceramics International, vol. 38, No. 1, pp. 211-216 (Jun. 25, 2011).
Potts, J.R. et al., "Graphene-based polymer nanocomposites," Polymer, vol. 52, No. 1, pp. 5-25 (Jan. 7, 2011).
Shahil, K.M.F. et al., "Graphene-Multilayer Graphene Nanocomposites as Highly Efficient Thermal Interface Materials," NANO Letters, vol. 12, No. 2, pp. 861-867 (Jan. 3, 2012).

(Continued)

*Primary Examiner* — Sheeba Ahmed
(74) *Attorney, Agent, or Firm* — Wilmer Cutler Pickering Hale and Dorr LLP

(57) ABSTRACT

The present invention relates to novel nanocomposite materials, methods of making nanocomposites and uses of nanocomposite materials. In particular, the invention relates to composite materials which contain two-dimensional materials (e.g. graphene) in multi-layer form i.e. in a form which has a number of atomic layers. The properties of a composite material containing two-dimensional material is in multilayer from are shown to be superior to those which contain the two-dimensional material in monolayer form.

14 Claims, 10 Drawing Sheets

(56) References Cited

OTHER PUBLICATIONS

Figure 1:
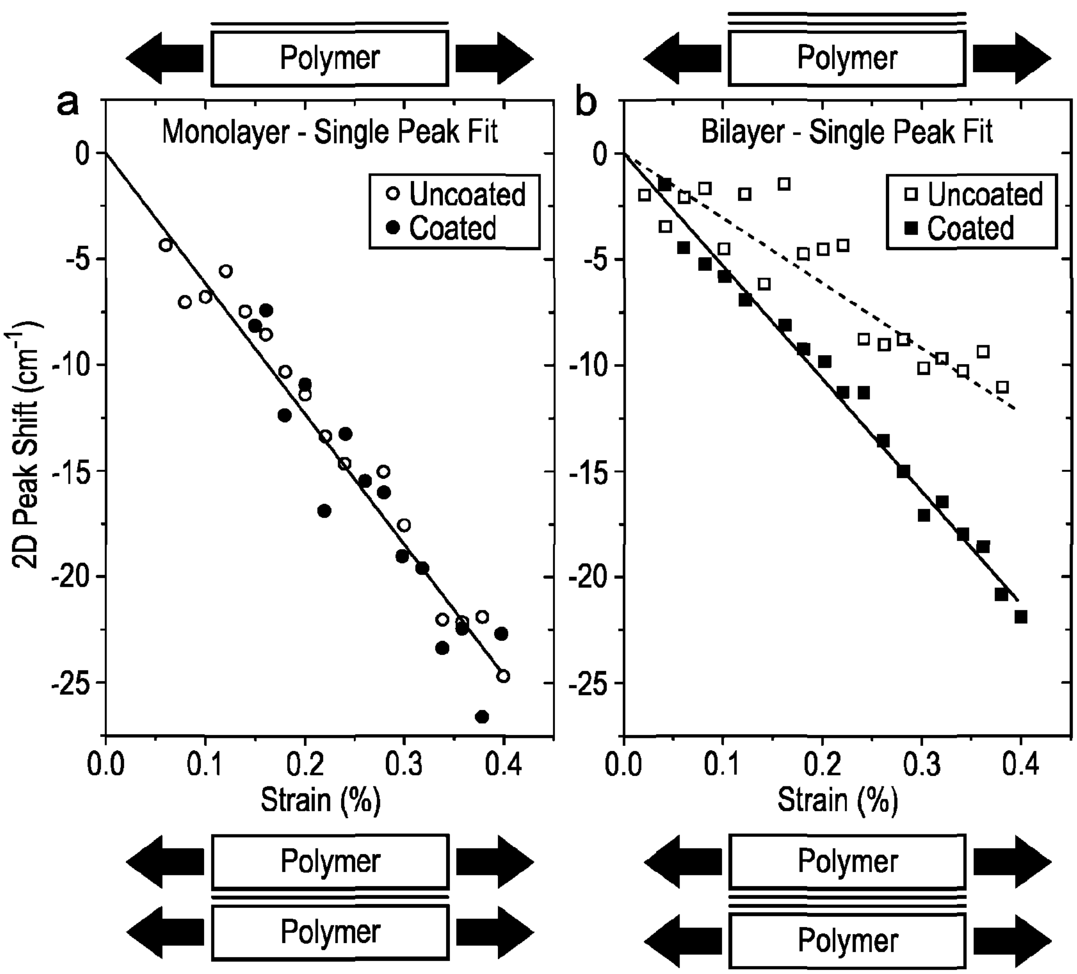

Young, R.J. et al., "The mechanics of graphene nanocomposites: A review," Composites Science and Technology, vol. 72, No. 12, pp. 1459-1476 (May 6, 2012).
Office Action dated Nov. 1, 2016, in Japanese Application No. 2014-555311, 9 pages—Including translation.
Marsden et al., "Electrical percolation in graphene-polymer composites," 2D Materials, Jun. 1, 2018, vol. 5, 19 pages.
Papageorgiou et al., "Mechanical properties of graphene and graphene-based nanocomposites," Progress in Materials Science, Oct. 2017, vol. 90, pp. 75-127.
Zalamea, L.; Kim, H.; Pipes, R. B., Stress Transfer in Multi-Walled Carbon Nanotubes. Comp. Sci. Tech., 2007, 67, 3425-3433.
D. Hull and T. W. Clyne, "Stresses and Strains in Short-Fibre Composites" in An Introduction to Composite Materials, 2d. Ed., Cambridge University Press: 2012, pp. 105-132.

* cited by examiner

GRAPHENE COMPOSITES

CROSS REFERENCE TO RELATED APPLICATIONS

This application is a National Stage Entry of PCT International Application No. PCT/GB2013/050215, filed on Jan. 31, 2013, which claims priority to GB Application No. 1201649.9, filed Jan. 1, 2012, the contents of which are incorporated herein by reference in their entirety.

The present invention relates to novel nanocomposite materials, methods of making nanocomposites and uses of nanocomposite materials. In particular, the invention relates to composite materials which contain graphene in multi-layer form i.e. graphene which has a number of atomic layers.

Previously the assumption in the art was that, when attempting to introduce the remarkable mechanical properties of graphene into composites, the incorporation of single layer graphene in composites (i.e. polymer composites) would lead to the best mechanical properties. This is because the mechanical properties of single layer graphene are better than those of multilayer graphene. Surprisingly, we have found that the incorporation of multilayer (e.g. bilayer, trilayer etc.) graphene can lead to composites with mechanical properties which are as good or better than composites with single layer graphene. Thus, the invention uses graphene which includes material having multiple layers. The graphene of the invention may be chemically functionalised in a conventional manner and as described in the literature.

We have also surprisingly found that in practice the novel multi-layer graphene and/or functionalised graphene is actually easier to distribute in the matrix of the composite. This in turn means that higher levels of graphene can be used when forming a composite material. One unexpected consequence is that we have found that the optimum properties for a composite can be obtained from the use of several-layer i.e. multi-layer graphene materials. A further advantage of the composites of the invention is that they are cheaper to produce than those composites which comprise single layer graphene or functionalised graphene. We have prepared a number of composites as described below and characterised them using Raman spectroscopy.

Some of the more important properties that the novel materials of the invention address are concerned with strength and modulus. However, there are other beneficial properties of the composite material. Some of these rely on inter particle connectivity (e.g.: electrostatic dissipation) or the creation of tortuous paths between platelets (e.g.: barrier). Some of the other properties which are addressed by our novel composites are listed below and the composites may exhibit improvements in some or all of these properties depending on the particular composition of the composite in question.

The properties of interest in the present invention may be separated into two lists. The first list concerns those properties that are related to mechanical features and which benefit from the novel construction of the composites. These properties include: strength, modulus, crack-resistance, fatigue performance, wear and scratch resistance, and fracture toughness. The second list relates to further (i.e. non-mechanical) properties that might benefit from the novel construction of the composites and includes: chemical resistance, electrical and electromagnetic shielding, gas and liquid barrier properties, thermal conductivity and fire resistance. We show that novel composites according to the invention have improvements in one or more of the above properties.

Graphene is one of the stiffest known materials, with a Young's modulus of 1 TPa, making it an ideal candidate for use as a reinforcement in high-performance composites.

Since graphene was first isolated in 2004 [K. S. Novoselov, A. K. Geim, S. V. Morozov, D. Jiang, Y. Zhang, S. V. Dubonos I. V. Grigorieva, A. A. Firsov, *Science,* 2004, 306, 666], the majority of the research effort has concentrated upon its electronic properties aimed at applications such as in electronic devices. One study [C. Lee, X. D. Wei, J. W. Kysar, J. Hone, *Science,* 2008, 321, 385] has also investigated the elastic mechanical properties of monolayers of graphene using nanoindentation by atomic force microscopy. It was shown that the material has a Young's modulus of the order of 1 TPa and an intrinsic strength of around 130 GPa, making it the strongest material ever measured.

Carbon nanotubes are under active investigation as reinforcements in nanocomposites and it is known that platelet reinforcements such as exfoliated nanoclays can be employed as additives to enhance the mechanical and other properties of polymers. Recently it has been demonstrated that polymer-based nanocomposites with chemically-treated graphene oxide as a reinforcement may show dramatic improvements in both electronic and mechanical properties (thus a 30 K increase in the glass transition temperature is achieved for only a 1% loading by weight of the chemically-treated graphene oxide in a poly(methyl methacrylate) matrix) as can be seen from T. Ramanathan, A. A. Abdala, S. Stankovich, D. A. Dikin, M. Herrera-Alonso, R. D. Piner, D. H. Adamson, H. C. Schniepp, X. Chen, R. S. Ruoff, S. T. Nguyen, I. A. Aksay, R. K. Prud'homme, L. C. Brinson, *Nature Nanotechnology,* 2008, 3, 327.

It is now well established that Raman spectroscopy can be used to follow stress transfer in a variety of composites reinforced with carbon-based materials such as carbon fibres and single- and double-walled carbon nanotubes. Such reinforcements have well-defined Raman spectra and their Raman bands are found to shift with stress which enables stress-transfer to be monitored between the matrix and reinforcing phase. Moreover, a universal calibration has been established between the rate of shift of the G' carbon Raman bands with strain that allows the effective Young's modulus of the carbon reinforcement to be estimated [C. A. Cooper, R. J. Young, M. Halsall, *Composites Part A-Applied Science and Manufacturing,* 2001, 32, 401]. Recent studies have shown that, since the Raman scattering from these carbon-based materials is resonantly enhanced, the strong well-defined spectra can be obtained from very small amounts of the carbon materials, for example individual carbon nanotubes either isolated on a substrate or debundled and isolated within polymer nanofibers.

Raman spectroscopy has also been employed to characterise the structure and deformation of graphene. It has been demonstrated that the technique can be used to determine the number of layers in graphene films [A. C. Ferrari, J. C. Meyer, V. Scardaci, C. Casiraghi, M. Lazzeri, F. Mauri, S. Piscanec, D. Jiang, K. S. Novoselov, S. Roth, A. K. Geim, *Physical Review Letters,* 2006, 97, 187401]. Graphene monolayers have characteristic spectra in which the G' band (also termed the 2D band) can be fitted with a single peak, whereas the G' band in bilayers is made up of 4 peaks, which is a consequence of the difference between the electronic structure of the two type of samples. Several recent papers have established that the Raman bands of monolayer graphene shift during deformation. The graphene has been deformed in tension by either stretching or compressing it on a PDMS substrate or a PMMA beam as can be seen in the following literature articles: M. Y. Huang, H. Yan, C. Y. Chen, D. H. Song, T. F. Heinz, J. Hone, *Proceedings of the National Academy of Sciences,* 2009, 106, 7304; T. M. G. Mohiuddin, A. Lombardo, R. R. Nair, A. Bonetti, G. Savini, R. Jalil, N. Bonini, D. M. Basko, C. Galiotis, N. Marzari, K. S. Novoselov, A. K. Geim, A. C. Ferrari, *Physical Review* 8, 2009, 79, 205433; and G. Tsoukleri, J. Parthenios, K. Papagelis, R. Jalil, A. C. Ferrari, A. K. Geim, K. S. Novoselov, C. Galiotis, *Small,* 2009, 5, 2397. It is also found that the G band both shifts to lower wavenumber in tension and undergoes splitting. The G' band undergoes a shift in excess of $-50\ cm^{-1}/\%$ strain which is consistent with it having a Young's modulus of over 1 TPa. One study of graphene subjected to hydrostatic pressure has shown that the Raman bands shift to higher wavenumber for this mode of deformation and that the behavior can be predicted from knowledge of the band shifts in uniaxial tension.

The thermal properties of graphite nanoplatelets—epoxy composites have been probed by Haddon et al. [Yu, A.; Ramesh, P.; Itkis, M. E.; Bekyarova, E.; Haddon, R. C., *J. Phys. Chem. C,* 2007, 111, 7565-7569.] The composites described comprise graphene with a thickness of 4 graphene layers and are found to be exhibit considerably enhanced thermal conductivities.

The present inventors recently described (WO 2011/086391) the preparation and testing of graphene-based composites. They used Raman spectroscopy to monitor stress transfer in a model composite consisting of a thin polymer matrix layer and a mechanically—cleaved single graphene monolayer using the stress-sensitivity of the graphene G' band. It was noted that the flakes need to have a minimum lateral dimension (i.e. x-y dimensions) in order to achieve a reasonable degree of reinforcement. In the present application, we consider the thickness (i.e. z-dimension) and show that composites containing fragments or flakes of graphene that are multiple-layered (i.e. more than 1 graphene layer) have comparable or better mechanical properties than composites containing only graphene monolayers. In particular, the multilayered graphene-containing polymer composites of the invention display improved stiffness, strength and/or toughness relative to composites containing only graphene monolayer fragments.

The multilayered graphene-containing polymer composites of the present invention are easier and cheaper to make than composites in which graphene is exclusively or predominantly in the form of graphene monolayers.

SUMMARY OF THE INVENTION

According to one aspect of the present invention, there is provided a composite material comprising:

a substrate or matrix; and graphene and/or functionalized graphene fragments dispersed within the matrix or provided on the substrate; wherein the graphene or functionalised graphene fragments comprise a plurality of individual fragments in which the average thickness of the fragments taken as a whole is between 2 graphene layers and 7 graphene layers.

According to a second aspect of the present invention, there is provided a composite material comprising:

a substrate or matrix; and graphene and/or functionalized graphene fragments dispersed within the matrix or provided on the substrate; wherein the graphene or functionalised graphene fragments comprise a plurality of individual fragments in which the thickness of the individual graphene fragments is such that at least 50% of the graphene or functionalised graphene has a thickness of between 2 layers and 7 layers.

The proportion of graphene or functionalised graphene present having the required number of layers is measured as either 50% by number or by weight; preferably, 50% by weight of the graphene or functionalised graphene has the required number of layers.

According to a third aspect of the present invention, there is provided a composite material comprising:

a substrate or matrix; and graphene and/or functionalized graphene fragments dispersed within the matrix or provided on the substrate; wherein the graphene or functionalised graphene fragments comprise a plurality of individual fragments and wherein the volume loading of the graphene or functionalised graphene in the matrix or on the substrate is at least 0.1 vol %.

According to a fourth aspect of the present invention, there is provided a composite material comprising:

a substrate or matrix; and a filler comprising of layered, inorganic 2 dimensional material with an in-plane modulus significantly higher than the shear modulus between the layers as exampled by, but not restricted to, graphene, $WS_2$ and $MoS_2$.

The filler comprises layered, inorganic 2 dimensional material with an in-plane modulus significantly higher than the shear modulus between the layers as exampled by, but not restricted to, graphene, $WS_2$ and $MoS_2$. The filler material may comprise of combinations of different materials. The filler material is dispersed within the matrix or provided on the substrate; wherein the filler fragments comprise a plurality of individual fragments in which the thickness of the filler fragments is such that at least 50% of the filler has a thickness of between 2 layers and 7 layers (i.e. the filler is in the form of flakes of the 2-dimensional material).

The proportion of graphene or functionalised graphene present having the required number of layers is measured as either 50% by number or by weight; preferably, 50% by weight of the graphene or functionalised graphene has the required number of layers.

According to a fifth aspect of the present invention, there is provided a composite material comprising:

a substrate or matrix; and a filler comprising of layered, inorganic 2 dimensional material with a in-plane modulus significantly higher than the shear modulus between the layers.

The filler comprises layered, inorganic 2 dimensional material with a in-plane modulus significantly higher than the shear modulus between the layers as exampled by, but not restricted to, graphene, $WS_2$ and $MoS_2$. The filler material may comprise of combinations of different materials. The filler material is dispersed within the matrix or provided on the substrate; wherein the filler fragments comprise a plurality of individual fragments and wherein the volume loading of the filler in the matrix or on the substrate is at least 0.1 vol %.

According to a sixth aspect of the present invention, there is provided a composite material comprising:

a substrate or matrix; and a filler comprising of layered, inorganic 2 dimensional material with a in-plane modulus significantly higher than the shear modulus between the layers.

The filler comprises layered, inorganic 2 dimensional material with a in-plane modulus significantly higher than the shear modulus between the layers as exampled by, but not restricted to, graphene, $WS_2$ and $MoS_2$. The filler material may comprise of combinations of different materials.

The filler material is dispersed within the matrix or provided on the substrate; wherein the filler fragments comprise a plurality of individual fragments in which the average thickness of the fragments taken as a whole is between 2 layers and 7 layers.

In an embodiment of the fourth, fifth or sixth aspect the filler is a two dimensional material. In an embodiment, the filler is graphene and/or functionalised graphene. In an alternative embodiment, the filler is a transition metal dichalcogenide (e.g. $WS_2$ and/or $MoS_2$, with $MoS_2$ being preferred).

The individual fragments of any two dimensional material (e.g. graphene and/or functionalised graphene; hereafter collectively referred to for brevity as graphene) are in the form of thin sheets typically having between about 1 and 15 layers, and more typically will be between 1 and 10 layers.

Importantly, the individual filler fragments present in the composite may have different numbers of layers; in other words the composite need not contain exclusively material of only one thickness, for example, 2-layer or 3-layered two-dimensional material. The distribution of, for example, 1-, 2-, 3-, 4-, 5-, 6-, and 7-layered material etc. within the composite is such that are average thickness of the layers is between 2 and 7 layers.

It is believed that this distribution i.e. mixture of graphene layers contributes to the improved mechanical properties of the graphene. The precise reason for this behaviour is not currently known. However, it is believed to be due to a balance between the packing efficiency of the graphene and the Young's modulus of the distributed fragments of varying thicknesses.

In an alternative embodiment, the composite may contain graphene having only 2-, 3-, 4-, 5-, 6-, and 7-layered graphene, with 2- and 3-layered graphene being preferred in this case. In this scenario, the composite material can also display improved stiffness, strength and/or toughness and this may again be due to packing effects though the exact reason is not understood.

The matrix is a bulk material within which the filler (e.g. graphene) is distributed. This will usually be a conventional polymer or plastics material for example a simple hydrocarbon polymer, or functionalised polymers containing halogen atoms, oxygen atoms, silicon atoms and combinations of these as found in conventional polymeric materials.

The substrate may be any material for which the filler (e.g. graphene) may provide a stiffening or reinforcing effect. For example, it may be a wafer of semiconductor material such as silicon or doped silicon or germanium etc. to which the graphene is adhered. This may be via chemical or mechanical means. Equally, it could be a polymeric material. In cases in which the graphene is distributed within a substrate rather than as a separate external layer, the substrate is effectively acting as a matrix.

In one embodiment, the composite material comprises the filler (e.g. graphene or functionalized graphene) attached to the substrate (e.g. attached to one or more surfaces of the substrate). In an alternate embodiment, the composite material is in the form of a matrix in which the filler (e.g. graphene or functionalised graphene) is distributed. For example, the filler (e.g. graphene or functionalised graphene) may be added to a polymer mix prior to extrusion to form the substrate or may added to a ceramic or cementatious material prior to curing. Equally, it may be added to low molecular weight crosslinkable materials (monomers or oligomers) prior to curing.

In an embodiment, the composite material comprises an adhesive component for adhering the filler (e.g. graphene or functionalized graphene) to the substrate (e.g. to one or more surfaces of the substrate). In an embodiment, the composite material comprises a protective layer to cover the filler (e.g. graphene or functionalized graphene). In an embodiment, the composite material comprises filler (e.g. graphene or functionalized graphene) attached to the substrate (e.g. to one or more surfaces of the substrate), an adhesive component and a protective layer to cover the filler (e.g. graphene or functionalized graphene). In an embodiment, the composite material does not comprise a protective layer to cover the graphene or functionalized graphene. In an embodiment, the composite material comprises graphene or functionalized graphene attached to the substrate (e.g. attached to one or more surfaces of the substrate) and an adhesive component (and does not include a protective layer to cover the graphene or functionalized graphene).

In an embodiment, the substrate of the composite material may itself be adhered to another structural material. The term "structural material" includes building materials (e.g. steels or concrete lintels) and also parts of existing structures such as bridges, buildings, aircrafts or other large structures.

In an embodiment, the graphene or functionalised graphene component is graphene. In a further embodiment, the graphene or functionalised graphene component is graphene which has not been previously chemically modified.

In an embodiment, the filler (e.g. graphene or functionalized graphene) is attached to the substrate by an adhesive component. The choice of the adhesive component will depend on the type of substrate and the filler component (e.g. whether the graphene component is functionalized or not and, if it is functionalized, the type and amount of functionalisation). In this regard, it is possible to tune the interface between the filler component and the adhesive component by selecting an appropriate adhesive. The adhesive component can include contact adhesives (e.g. adhesives that work upon pressure) as well as reactive adhesives. The adhesive component may therefore be selected from the group comprising: polyvinyl acetate (PVA) and an epoxy resin. Other adhesives include poly(alcohol), acrylics, poly(urethane), poly(imides), rubber, latex, poly(styrene) cement, cyanoacrylate, ethylene-vinyl acetate, poly(vinyl acetate), silicones, acrylonitrile and acrylic.

The thickness of the graphene or functionalised graphene component can be described in terms of the number of layers of graphene sheets or functionalised graphene sheets. Each layer of graphene in an individual flake or fragment will be 1 atom thick. Thus, throughout this specification, any description of the thickness of graphene or functionalised graphene in terms of layers, is equivalent to the same thickness in terms of atoms. As an example, graphene which is one layer thick can also be described as being one atom thick and vice versa.

The filler component (i.e. the graphene fragments) of the composite may be present as a plurality of different thicknesses. The filler provided in bulk to the matrix or substrate may comprise a plurality of individual fragments. Each individual fragment i.e. flake of the filler may have a plurality of thicknesses. Each individual fragment may have a thickness profile, in which the thickness of the flake varies across the flake. Thus, the filler component of the composite may not be present as a single thickness and in this case the graphene component as a whole will have an average thickness.

In embodiments in which the filler (e.g. graphene or functionalised graphene) component is present in a plurality of thicknesses, the individual thicknesses are such that the filler fragments as a whole will have an average thickness.

This average thickness will be the mean thickness, expressed in layers or atoms, of the filler component present in the composite. The filler fragments as a whole may have an average thickness of between 2 and 7 layers. A layer of graphene is 1 atom thick. Thus, the graphene fragments as a whole may have on average a thickness of between 2 and 7 atoms. The filler fragments as a whole may have an average thickness of between 2 and 5 layers or it may have an average thickness of between 2 and 4 layers. The average thickness may be about 2, i.e. between 1.5 layers and 2.5 layers. Alternatively the average thickness may be about 3 layers, i.e. between 2.5 layers and 3.5 layers. In another alternative, the average thickness may be about 4 layers, i.e. between 3.5 layers and 4.5 layers.

Another way of describing a two dimensional material (e.g. graphene or functionalised graphene) with a plurality of thicknesses is in terms of the proportion of the two dimensional material component present in the composite which has a thickness between two limits. Thus, it may be that at least 50% by weight of the two dimensional material has a thickness between two limits such as those described above i.e. between 2 and 7 layers. Further, it may be that at least 75% by weight of the two dimensional material has a thickness between two limits. In an embodiment, at least 80% by weight of the two dimensional material has a thickness between two limits. In an embodiment, at least 85% by weight of two dimensional material has a thickness between two limits. In a further embodiment, at least 90% by weight of the two dimensional material has a thickness between two limits. In yet another embodiment, at least 95% by weight of the two dimensional material has a thickness between two limits. This material will in each case contain a distribution of layers of the two dimensional material so that the material does not contain 100% by weight of two dimensional material of one thickness.

In an embodiment, the lower of the two limits described above is 2 layers. In an alternative embodiment, the lower of the two limits described above is 3 layers. In an embodiment, the upper of the two limits described above is 7 layers. In a further embodiment, the upper of the two limits described above is 5 layers. The upper of the two limits described above may be 4 layers or the upper of the two limits described above may be 3 layers.

The greater the average number of layers which are present in the filler component, the higher the volume loading of the component in the composite which can be achieved. Thus, the volume loading may be greater than 0.1%, greater than 1.0%, or greater than 2% and can be 10% or more. More preferably the volume loading is greater than 25%. In an embodiment, the volume loading of the graphene or functionalised graphene component may be greater than 30% or the volume loading is greater than 40%. In a further embodiment, the loading is greater than 50%. The loading may be greater than 75%. In an embodiment, the volume loading of the graphene or functionalised graphene component is less than 80%. In a further embodiment, the loading is less than 70%. In yet another embodiment the loading may be less than 75%. The loading may be less than 60% or the loading may be less than 50%. In some embodiments, the loading is less than 40% or even less than 25%. Any of the above maximum and minimum loadings may be combined to form a range in which the preferred volume loading may fall.

In an alternate embodiment, the filler (e.g. graphene) fragments have exclusively i.e. substantially all the same number of layers.

The substrate surface to which the filler (e.g. graphene) is applied is usually substantially flat. However, the methods of the present invention are applicable to irregular surfaces e.g. surfaces containing peaks, troughs and/or corrugations. Alternatively, the substrate surface to which the filler is applied is rounded. Surface variations from flatness may be from 0.1 to 5 nm.

In an embodiment, the nanocomposite material comprises filler (e.g. graphene or functionalized graphene) embedded within the matrix. Typically, in this embodiment, the nanocomposite material need not comprise an adhesive component.

The underlying matrix may be any polymeric material. However, ideally to ensure good adhesion and retention of the graphene it is important for the polarity of the polymer to be compatible with the graphene or the functionalised graphene (e.g. both the polymer and graphene have similar surface energies). Suitable polymer substrates include polyolefins, such as polyethylenes and polypropylenes, polyacrylates, polymethacrylates, polyacrylonitriles, polyamides, polyvinylacetates, polyethyleneoxides, polyethylene, terphthalates, polyesters, polyurethanes and polyvinylchlorides. Preferred polymers include epoxides, polyacrylates and polymethacrylates. Silicone polymers could also be used.

In an embodiment, the nanocomposite material comprises graphene that has not been previously chemically modified (i.e. pristine graphene). In an alternate embodiment, the nanocomposite material comprises functionalised graphene (i.e. graphene that has been previously chemically modified, e.g. graphene oxide). Graphene may be functionalized in the same way in which carbon nanotubes are functionalized and the skilled person will be familiar with the various synthetic procedures for manufacturing functionalized carbon nanotubes and could readily apply these techniques to the manufacture of functionalized graphene. This may include functionisation with halogen (e.g. fluoro and/or chloro atoms) and/or functionalisation with oxygen-containing groups (e.g. carboxylic acids, hydroxides, epoxides and esters etc.).

Chemical functionalisation of the graphene may assist in the manufacturing of the graphene polymer composite (e.g. by aiding dispersion of the graphene in an adhesive component or in the substrate component). Chemical functionalisation of the graphene may also improve the interface between the graphene and the adhesive material, which can lead to an increase in the Raman peak shift per unit strain (which in turn leads to a more accurate strain sensor). In this regard, it is possible to tune the interface between the graphene component and the adhesive component by selecting an appropriately functionalized (or partially functionalized) graphene component for a particular adhesive component. However, pristine graphene itself has a stronger Raman signal as compared with functionalised graphene (which in turn leads to a more accurate strain sensor). Thus, when the nanocomposite is to be used as a strain sensor, it is desirable to balance the strength of the Raman signal of the graphene component itself with the possibility of improved interface between the graphene and the other nanocomposite components (and therefore increased Raman peak shift per unit strain). Thus, even very highly functionalised graphene (for example graphene oxide), which has a lower Raman signal than pristine graphene, can be used as a component in a strain sensor when the adhesive component is judiciously selected.

According to a seventh aspect of the present invention, there is provided a method of preparing a graphene polymer composite, the method comprising the steps of: providing a plurality of individual filler (e.g. graphene) fragments; and either providing a substrate, and depositing the filler (e.g. graphene) fragments onto the substrate, wherein the filler (e.g. graphene) is not chemically treated prior to deposition on the polymer substrate; or admixing the filler (e.g. graphene) fragments with a matrix-forming material to produce a dispersion of filler (e.g. graphene) in the matrix and optionally curing the matrix forming material.

In an embodiment, the filler (e.g. graphene) may be obtained by mechanically cleaving a multi-layer version of the filler material (e.g. graphite) to produce fragments having only a few layers thickness. This step occurs prior to the step of providing a plurality of individual filler (e.g. graphene) fragments. Some or all of the filler (e.g. graphene) fragments can then optionally be functionalised, as required, before admixing with the matrix-forming material or depositing on the substrate to form the composite. When the filler is graphene which is subsequently modified with suitable chemical groups, the functionalised graphene is chemically compatible with a polymer matrix, allowing transfer of the properties of the graphene (such as mechanical strength) to the properties of the composite material as a whole.

In alternative embodiments, the filler (e.g. graphene) may be obtained and deposited on the substrate by chemical deposition techniques, e.g. chemical vapour deposition or liquid phase exfoliation (e.g. spin coating and Langmuir-Blodgett technique).

The matrix forming material is a material such as a polymer, a mixture of monomers, or low molecular weight material or oligomers or reactive polymers, that may be cured to form a polymer or it may be a cementatious or ceramic material that may be cured to form a matrix within which the graphene is dispersed. The matrix forming material may be in liquid or solid form.

In another embodiment, the thickness of the individual graphene fragments is such that at least 50% by weight of the graphene has a thickness between 2 layers and 7 layers.

In yet another embodiment, the relative quantities of the graphene fragments and substrate of polymeric material or the liquid formulation are such that the volume loading of the graphene or functionalised graphene in the graphene polymer composite is over 10%.

The graphene may be provided by mechanical cleaving of graphite, or any other way conventionally used to obtain graphene. Thus, for instance it may be obtained by cleaving graphene from SiC substrates, chemical exfoliation of graphene, or using epitaxial graphene.

The thickness and/or thickness distribution of the graphene may be examined to ensure that it is suitable for incorporation into the composites according to the invention and any unsuitable graphene is rejected.

In one embodiment, the resulting graphene polymer composite may itself be treated chemically to functionalise the composite material.

According to an eighth aspect of the present invention, there is provided the use of a composite as defined above for the production of an electronic device. The electronic device may be a capacitor, a sensor, an electrode, a field emitter device or a hydrogen storage device. The material may also be used in the construction of a transistor.

According to a ninth aspect of the present invention, there is provided the use of a composite as defined above for the production of a structural material. A structural material is a reinforced material that is strengthened or stiffened on account of the inclusion of the filler (e.g. graphene or functionalized graphene). In an embodiment, the structural material may be used as a load bearing component of a mechanical device or a structure. In an embodiment, the structural material may be used as a part of a protective layer or a protective container.

In a tenth aspect of the present invention, there is provided graphene or functionalised graphene comprising a plurality of individual graphene fragments having an average thickness of between 2 graphene layers and 7 graphene layers, and/or wherein the thickness of the individual graphene fragments is such that at least 50% of the graphene has a thickness between 2 layers and 7 layers.

The proportion of graphene or functionalised graphene present having the required number of layers is measured as either 50% by number or by weight; preferably, 50% by weight of the graphene or functionalised graphene has the required number of layers.

In an eleventh aspect of the invention, there is provided the use of a filler for improving one or more of the mechanical properties selected from the group comprising: the strength, modulus, wear resistance, and hardness, of a matrix or substrate by incorporating a filler into the matrix and/or applying the filler onto the substrate to form a composite material, wherein at least one of the aforementioned mechanical properties is improved relative to that of the matrix or substrate, and wherein the filler comprises a plurality of individual fragments having an average thickness of between 2 layers and 7 layers, and/or wherein the thickness of the individual filler fragments is such that at least 50% of the filler has a thickness between 2 layers and 7 layers.

The embodiments described above in relation to the first to sixth aspects of the invention above all apply equally to the other aspects of the invention described herein. Thus, in an embodiment, the thickness of the individual graphene fragments is such that the average thickness of the graphene fragments as a whole is between 2 graphene layers and 7 graphene layers.

Any of the above statements which describe an embodiment of the invention in which the composite comprises graphene or functionalised graphene may also apply to embodiments of the invention in which the composite does not comprise graphene or functionalised graphene, e.g. those embodiments in which the composite comprises another two-dimensional material (e.g. a transition metal dichalcogenide, for example, $WS_2$ and $MoS_2$).

The combination of electronic and mechanical properties of the polymer composites of the invention renders them suitable for a wide range of uses including: their potential use in future electronics and materials applications, field emitter devices, sensors (e.g. strain sensors), electrodes, high strength composites, and storage structures of hydrogen, lithium and other metals for example, fuel cells, optical devices and transducers.

Where the composite structures exhibit semiconductive electrical properties, it is of interest to isolate bulk amounts thereof for semiconductor uses.

The particular graphene area and thickness on the substrate, as well as the topology affects the physical and electronic properties of the composite. For example, the strength, stiffness, density, crystallinity, thermal conductivity, electrical conductivity, absorption, magnetic properties, response to doping, utility as semiconductors, optical properties such as absorption and luminescence, utility as emitters and detectors, energy transfer, heat conduction, reaction to changes in pH, buffering capacity, sensitivity to a range of chemicals, contraction and expansion by electrical charge or chemical interaction, nanoporous filtration membranes and many more properties are affected by the above factors.

As used herein, 'strength' may mean tensile strength, compressive strength, shear strength and/or torsional strength etc.

As used herein, 'modulus' may mean an elastic modulus (storage modulus) and/or a loss modulus. In some specific embodiments, 'modulus' may refer to Young's modulus.

DETAILED DESCRIPTION

The invention will be described in more detail, by way of example only, by reference to the following figures:

FIG. 1. shows the shift with strain of 2D Raman band of the graphene fitted to a single peak during deformation upon the PMMA beam. (a) A graphene monolayer deformed before and after coating with SU-8. (b) A graphene bilayer deformed before and after coating with SU-8. (Schematic diagrams of the deformation of the uncoated (above) and coated (below) graphene are also included).

Figure 2:
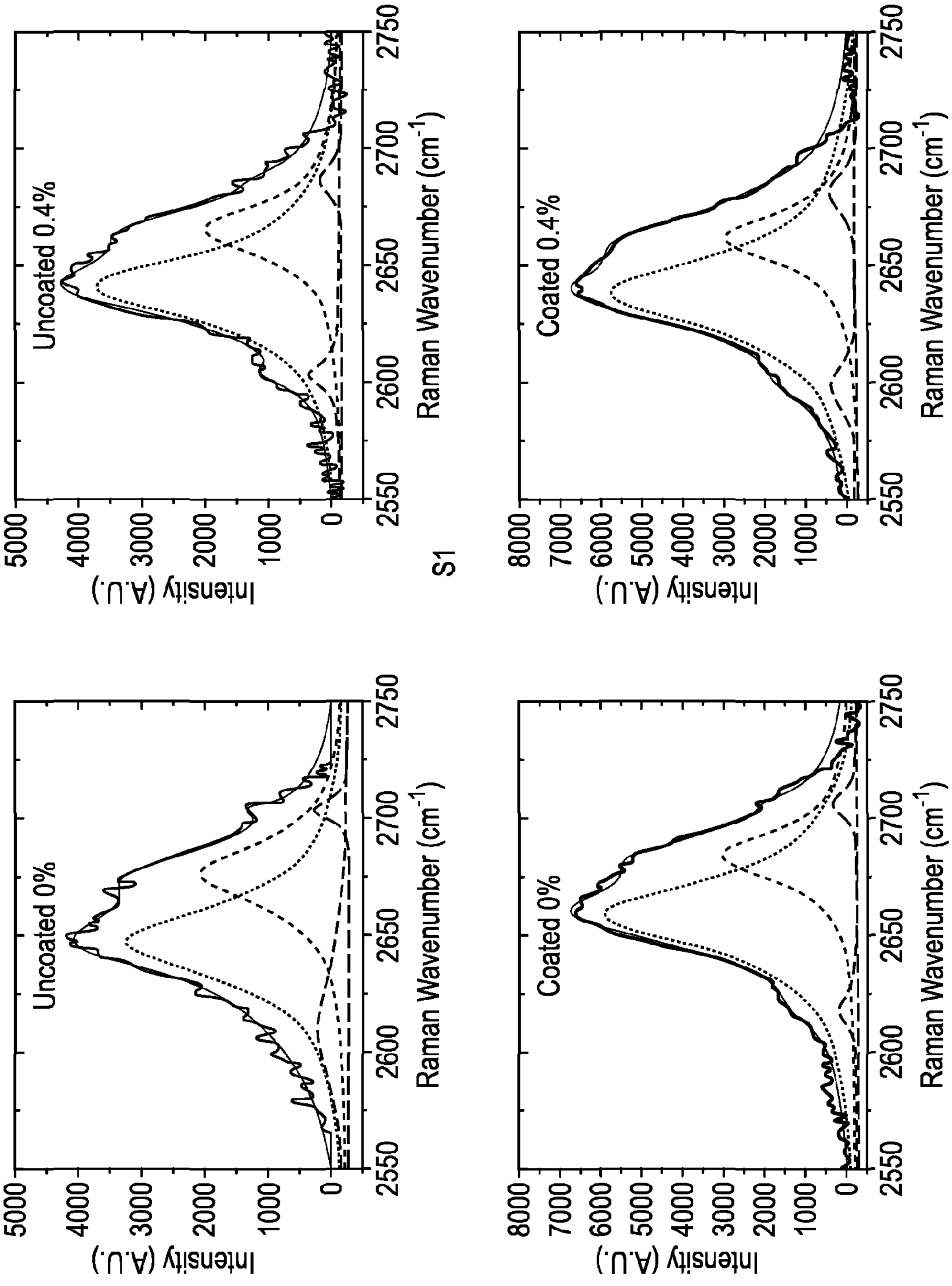

FIG. 2. shows the detail of the 2D Raman band for the bilayer graphene both before and after deformation to 0.4% strain when it is either uncoated or coated. The fit of the band to four sub-bands is shown in each case as broken lines and the fitted curve is also shown.

Figure 3:
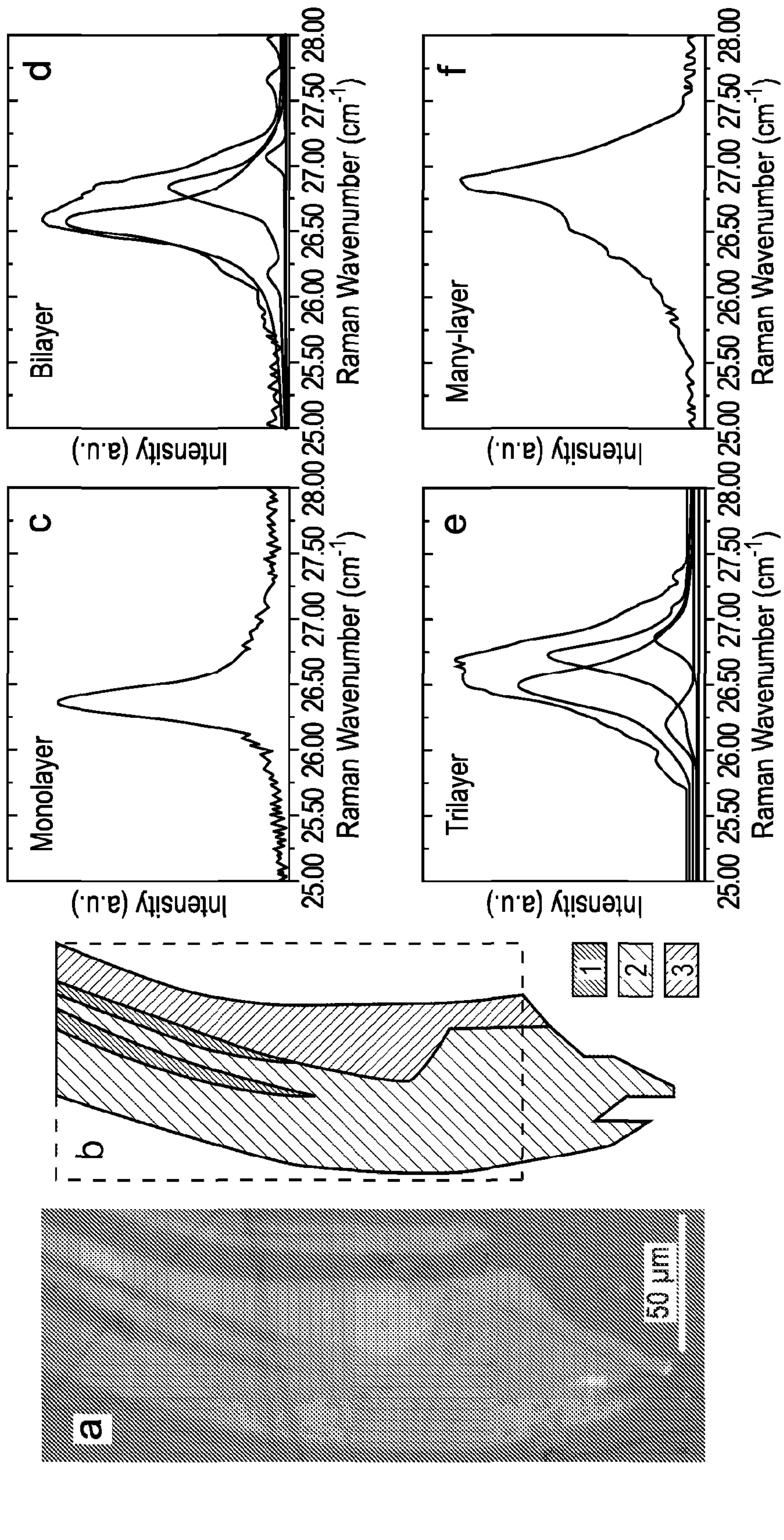

FIG. 3. shows graphene flake on a PMMA beam with monolayer, bilayer and trilayer regions also illustrated. (a) Optical micrograph (the fine straight lines are scratches on the surface of the beam). (b) Schematic diagram of the flake highlighting the different areas (the rectangle shows the area of the flake over which the strain was mapped). (c-f) Raman spectra of the 2D band part of the spectrum for the monolayer, bilayer (fitted to 4 peaks), trilayer regions (fitted to 6 peaks) and a multilayer graphene flake, elsewhere on the beam.

Figure 4:
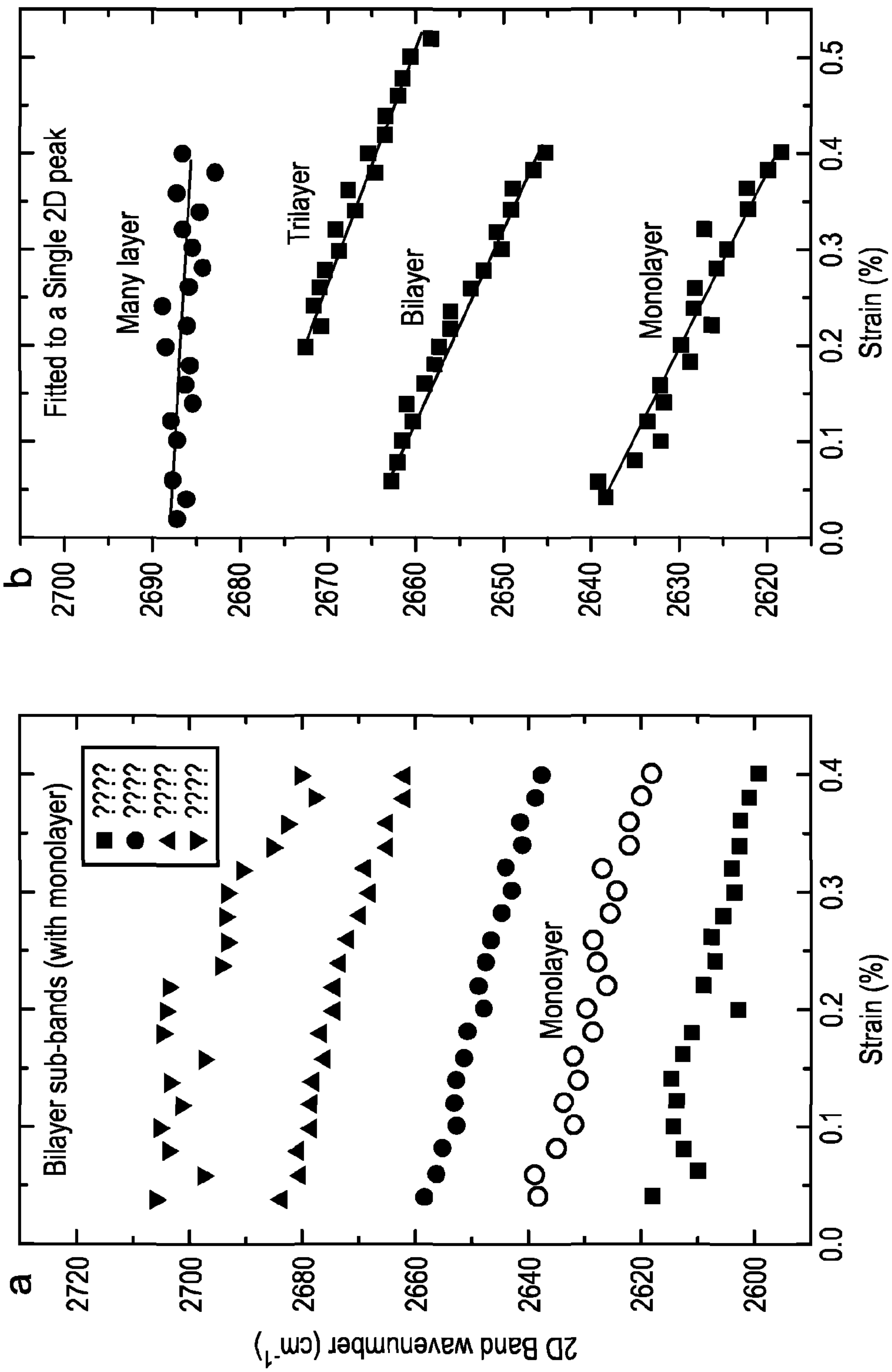

FIG. 4. shows (a) the shift with strain of the four components of the 2D Raman band of the bilayer graphene shown on the specimen in the FIG. 2 along with the shift of the 2D band in an adjacent monolayer region on the same flake; and (b) the shifts with strain of the 2D band for adjacent monolayer, bilayer and trilayers regions on the specimen in FIG. 2, along with the shift with strain for the 2D band of a multilayer flake on the same specimen (all 2D bands were force fitted to a single Lorentzian peak).

Figure 5:
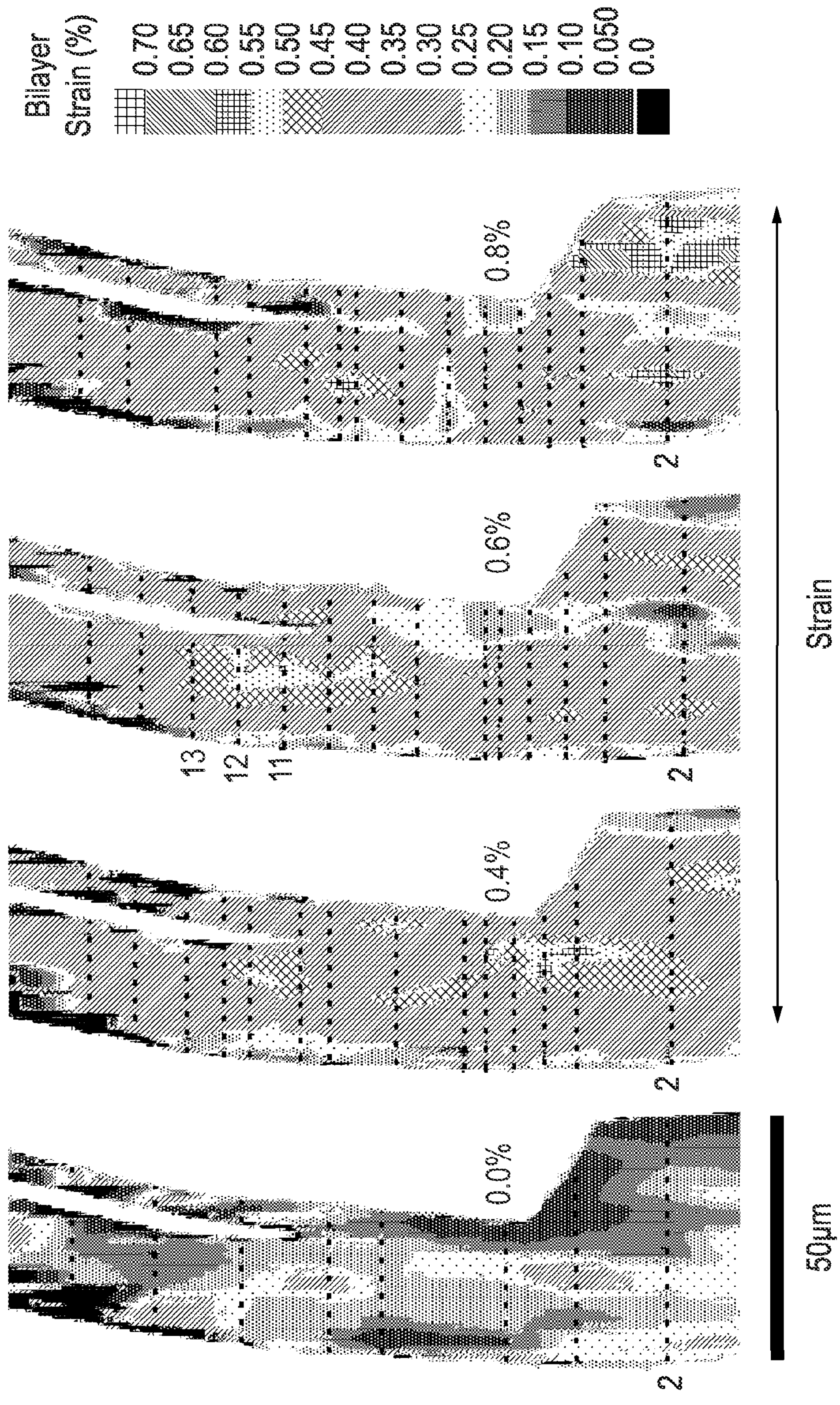

FIG. 5. shows maps of strain in the graphene bilayer regions of the flake shown in FIG. 3, determined from the shift of the 2D1A component of the 2D Raman band, for different levels of matrix strain in the direction indicated by the arrow. The black dots indicate where measurements were taken and the individual rows of data analyzed later are marked. The monolayer and trilayer regions in the flake have been masked out for clarity.

Figure 6:
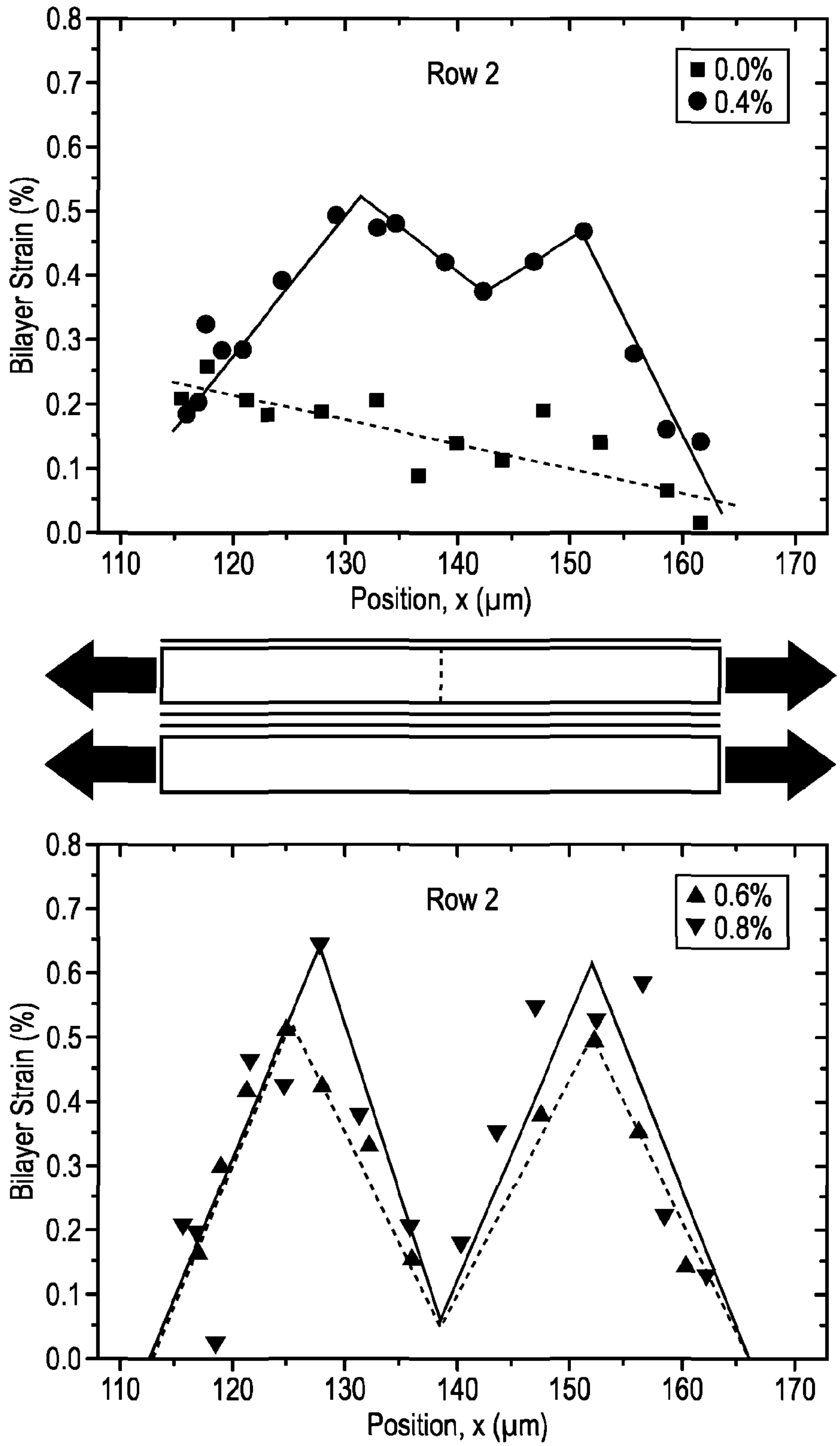

FIG. 6. shows the variation of strain in the graphene bilayer with position along row 2 (indicated in FIG. 5), at different levels of matrix strain, $\varepsilon_m$, showing the development of a matrix crack (see schematic diagram).

Figure 7:
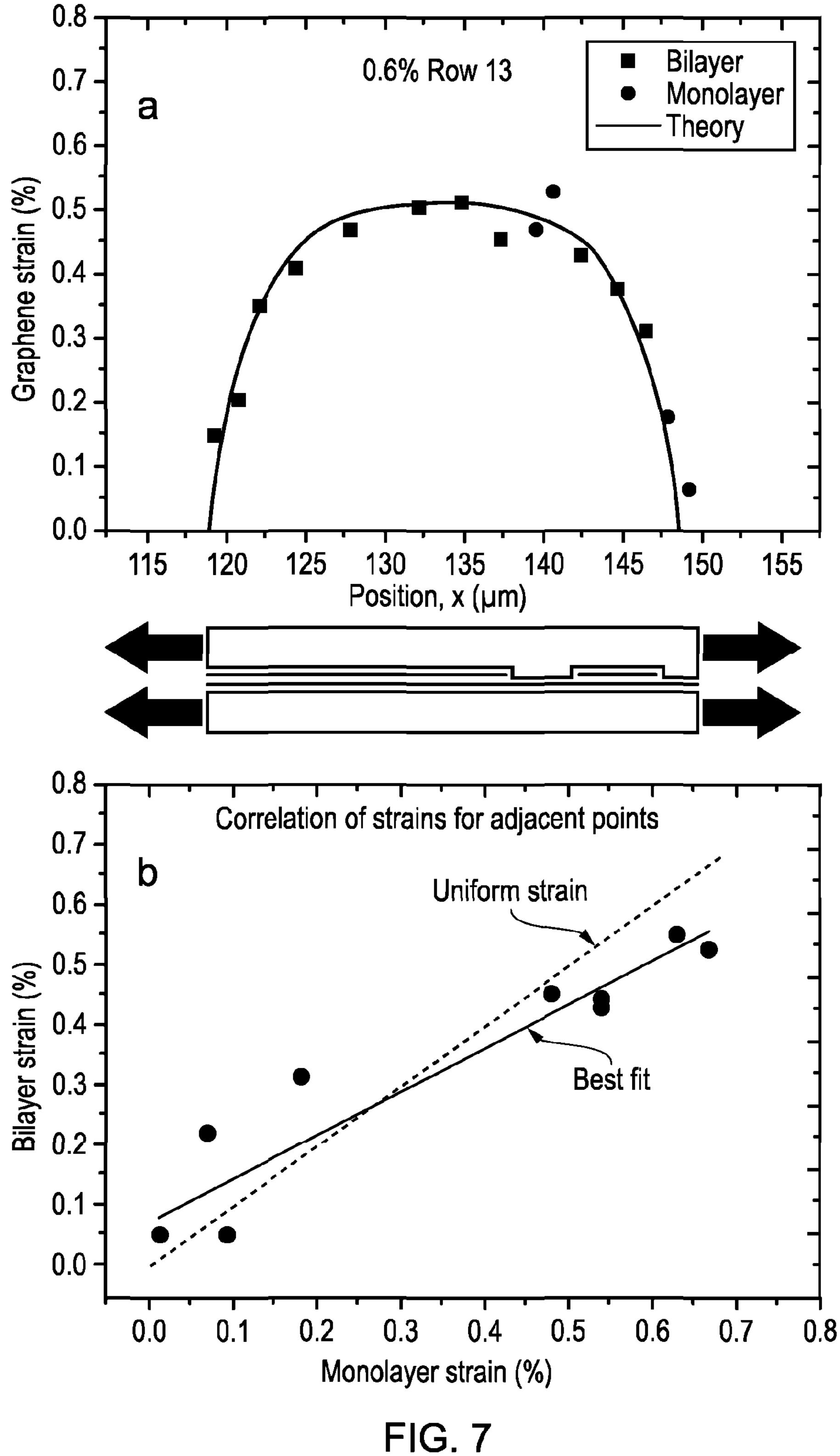

FIG. 7. shows (a) the variation of strain in the monolayer and bilayer regions of graphene with position along row 13 (indicated in FIG. 5) at an applied strain of 0.6%. The theoretical curve is a fit to the data points using Equation 4 derived from shear lag theory with ns=10; and (b) the correlation of measured strains in adjacent regions of the monolayer and bilayer graphene in rows 11-13 (FIG. 5) at 0.6% applied strain. (The schematic diagram shows the variation of the number of graphene layers across the row).

Figure 8:
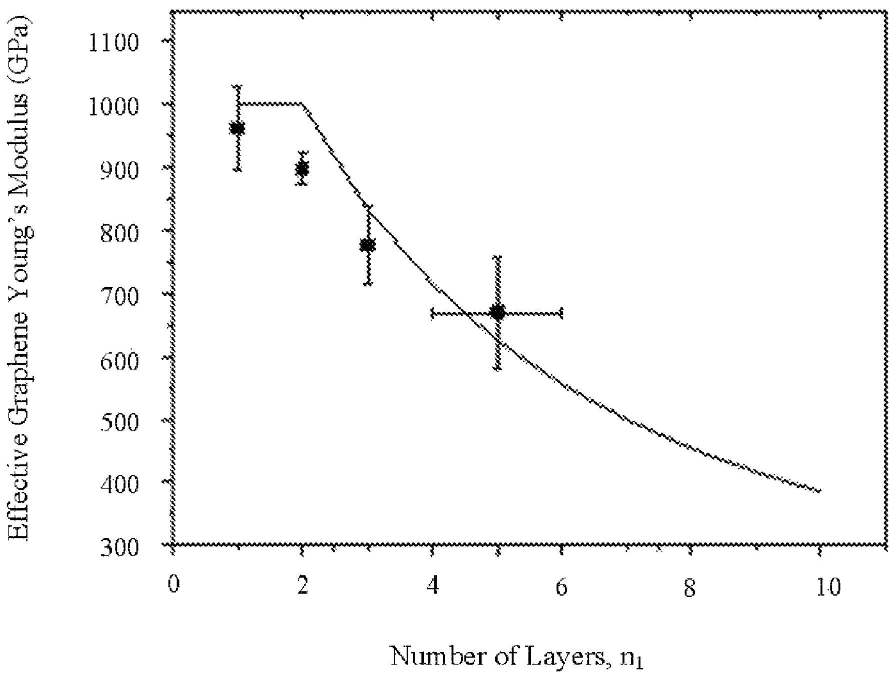

FIG. 8. shows the experimentally measured values of the modulus of graphene flakes as a function of flake thickness. The modulus is measured from the shift rate of the Raman G' band per unit strain, taking the calibration coefficient as $-60$ $cm^{-1}$/% per 1 TPa. The y-error bars are the error on the mean calculated from repeat measurements on different samples (n=4 to 7). The black line denotes the model fit to the experimental data, which can then be used to predict the modulus of a graphene flake for a given number of layers.

Figure 9:
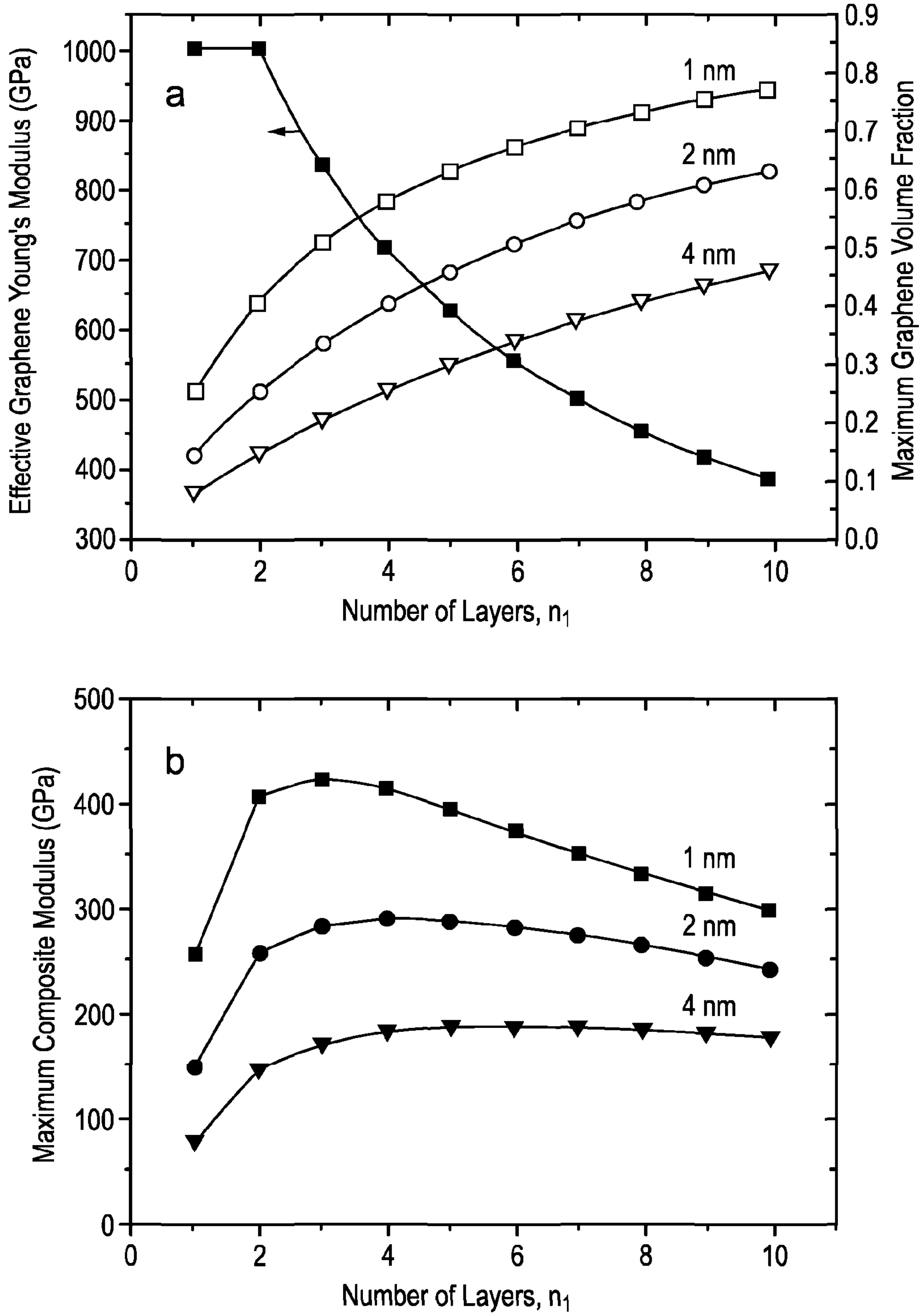

FIG. 9. shows (a) the effective graphene Young's modulus, $E_{eff}$, as predicted from the experimentally derived model and achievable volume fraction (as calculated from highly aligned graphene surrounded by a polymer layer 1, 2 or 4 nm thick), as a function of the number of layers, $n_l$, in the graphene flakes; and (b) the maximum nanocomposite modulus predicted for different indicated polymer layer thicknesses as a function of the number of layers, $n_l$, in the graphene flakes.

Figure 10:
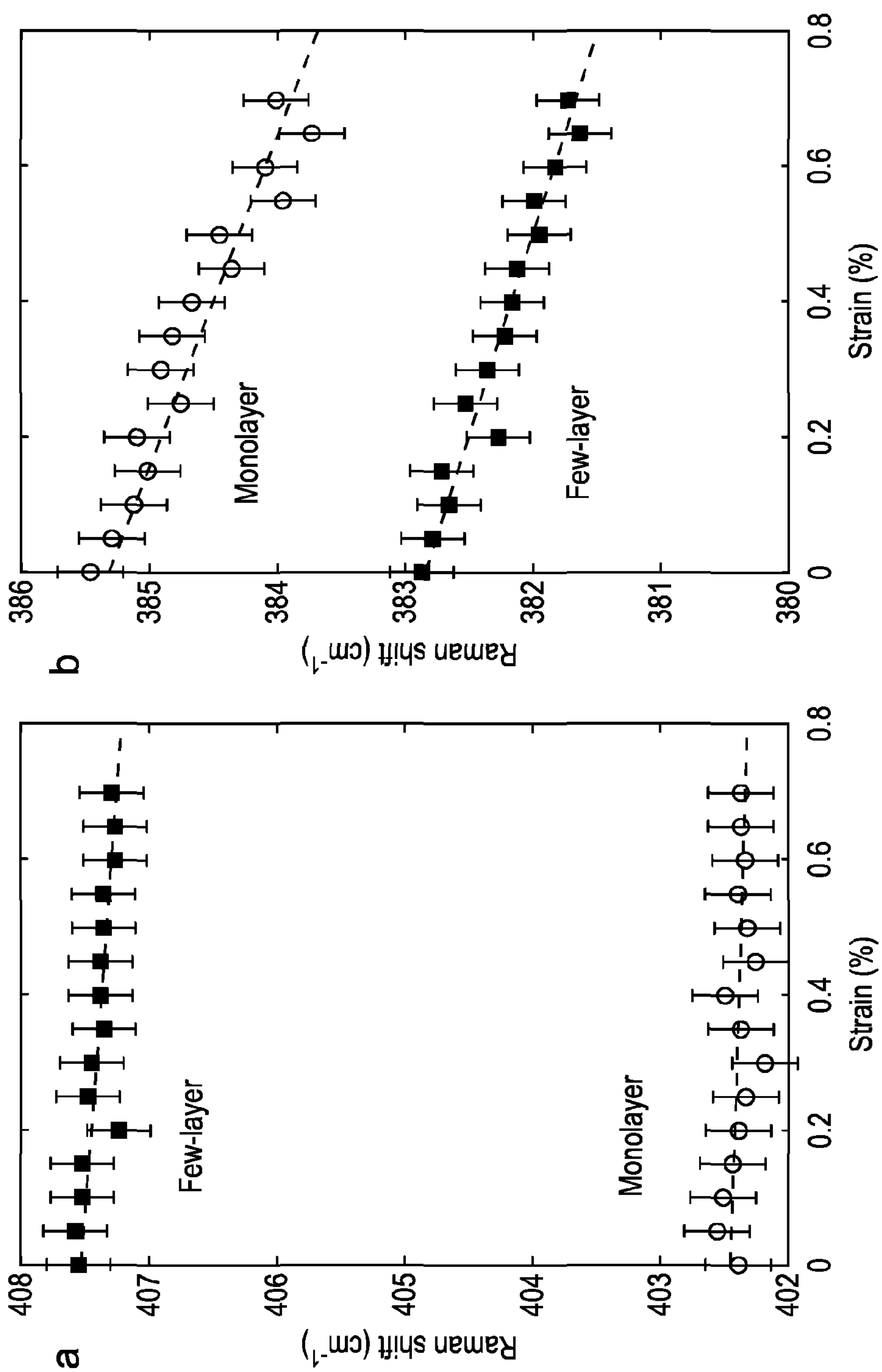

FIG. 10. shows the peak position with strain of the (a) $A_{1g}$ and (b) $E^1_{2g}$ Raman peaks from monolayer (open circles) and few-layer (i.e. 4-6 layers; filled squares) $MoS_2$. Error bars indicate the spectrometer resolution.

EXAMPLE 1

Graphene Composites

Raman spectroscopy measures the vibrational energy (also known as the phonon energy) of a bond through the inelastic scattering of light. The energy difference between the incident and scattered light is the same as the energy of the vibrations in the sample. The data is plotted as the wavenumber shift in the scattered light (i.e. phonon energy) against the intensity of the light (related to number of phonons). Raman spectroscopy is typically used to identify a material, since each bond type has a distinct energy band.

Raman spectroscopy can also be used to follow the environmental changes that alter a bond's energy. For example, the Raman bands shift upon bond deformation; tensile deformation shifts the band to lower wavenumbers and compressive deformation shifts the band to higher wavenumbers. The larger the deformation, the higher the band shift, with the rate of change of phonon's energy with strain being predicted theoretically using the Gruneisen parameter. This strain-dependence of the Raman band shift allows local strain or stress to be measured with a few micron spatial resolution. Such an approach has been used for a wide variety of systems, including polymers (e.g. poly(ethylene) and poly-aramids), carbon fibres and graphene.

The shift of the 2D band with tensile strain for different monolayer and bilayer graphene flakes, deformed both before and after applying the SU-8 top-coat, is shown in FIG. 1. The maximum strain in this case was 0.4% which is known to be below the level of strain at which debonding of the flakes or matrix polymer cracking can occur. It can be seen from FIG. 1*a* that the shift of the 2D Raman band for the graphene monolayer is $-59$ $cm^{-1}$/% strain and similar with and without the polymer top-coat. It is well established that the rate of shift per unit strain of the 2D Raman band for monolayer graphene depending upon the crystallographic orientation of the monolayer relative to the strain axis and this value is within the range found by others, in both uncoated and coated specimens. In contrast, it is shown in FIG. 1*b* that when the 2D Raman band is fitted to a single peak, the rate of shift per unit strain for an uncoated graphene bilayer ($-31$ $cm^{-1}$/% strain) is significantly less that of the same flake deformed after being coated ($-53$ $cm^{-1}$/% strain). The implications of this observation for the bilayer is that stress transfer between the polymer substrate and the graphene is relatively good, as has been found before, but that the efficiency of stress transfer between the lower and upper graphene layers is relatively poor. This is not an issue for the monolayer in FIG. 1*a* where the presence of the top-coat makes no difference to the band shift rate.

The band-shift data in FIG. 1*b* are for the 2D band for the bilayer graphene fitted to a single peak. It is well established that the 2D band for the bilayer material can be fitted to four peaks. Details of this band are also shown before and after deformation for the specimen both uncoated and coated.

It is well established that the 2D Raman band of bilayer graphene consists of four peaks. The shift of this band fitted to a single peak is shown for both uncoated and coated bilayer flakes in FIG. 1*b* and the shift of the individual sub-bands is shown in FIG. 4*a*. One issue that arises is the extent to which the A-B Bernal packing is maintained during deformation. This can be ascertained from the effect of deformation upon the shape and form of the band.

FIG. 2 shows the detail of the 2D band for the bilayer graphene both before and after deformation to 0.4% strain when it is either uncoated or coated. The four characteristic sub-bands can be seen in each.

In order to gain a further insight into the behavior of flakes with different numbers of graphene layers the deformation of a coated flake containing regions of monolayer, bilayer and trilayer graphene was investigated. An optical micrograph of the flake is given in FIG. 3*a* along with a schematic diagram in FIG. 3*b* showing the different regions in the micrograph determined from both thickness contrast and Raman spectra. The 2D Raman spectra obtained from the monolayer, bilayer and trilayer regions are shown in FIG. 3*c-e* respectively. It can be seen that the monolayer 2D band comprises a single peak whereas the bilayer and trilayer 2D bands can be fitted to four and six sub-bands respectively. In addition, a 2D band of a coated few-layer graphene flake (micrograph not shown) is given for reference in FIG. 3*f*. The band in this case is similar to that of graphite.

FIG. 4 shows how the deformation of the middle of adjacent monolayer, bilayer and trilayer regions of the flake in FIG. 3 up to 0.4% strain was followed from the shifts of their 2D Raman bands. The advantage of doing this on the same flake is that it can be ensured that the orientation of the graphene is identical in each region. The shift with strain of the four components of the bilayer graphene 2D band is shown in FIG. 4*a*. The shift of the adjacent monolayer region is shown for comparison. The 2D1B and 2D2B sub-bands (labeled) are relatively weak and therefore are somewhat scattered but it can be seen that the slope of the two strong components 2D1A and 2D2A, are similar to each other, (−53 and −55 $cm^{-1}$/% strain respectively) and also similar to the slope of the adjacent monolayer region (−52 $cm^{-1}$/% strain).

The 2D band shifts with strain of the four different coated graphene structures is given in FIG. 4*b*, with 2D band force fitted to a single Lorentzian peak in each, for comparison purposes. The few-layer graphene was from a different region of the specimen and the strain in trilayer was off-set since it was deformed after pre-loading of the beam to examine the behavior other regions and so a permanent set had developed. The 2D Raman band positions at a given strain are off-set from each other due to differences in the band structure of the different forms of graphene, as has been shown elsewhere. It can also be seen that the slopes of the plots are similar for the monolayer and bilayer material (−52 and −53 $cm^{-1}$/% strain respectively) but somewhat lower for trilayer at −44 $cm^{-1}$/% strain. In contrast, the slope for the few-layer graphene is significantly lower at around −8 $cm^{-1}$/% strain.

Although the data shown in FIGS. 1 & 4 suggest that the 2D band shifts rates vary with the number of layers in the graphene and the presence or of absence a polymer top coat, there is always the possibility that such variations may be due to inhomogeneities or uneven stress transfer due to slippage. Variations in the band shift behavior are also known to occur due differences in excitation wavelength, relative orientation of the graphene lattice to the straining direction and direction of laser polarization. Because of this a systematic study was undertaken of the band shifts during deformation for more than 30 different graphene flakes on polymer beams in different orientations, consisting of different numbers of layers, both uncoated and with a polymer top coat. A different laser excitation was also employed (785 nm rather than 633 nm) and the data were carefully screened for evidence of slippage. Details of this investigation are given in the Supporting Information and the relative 2D band shift rates with strain are summarized in Table 1.

| Number of layers | Coating | $d\omega_{2D}/d\varepsilon$ ($cm^{-1}$/% strain) | Number of flakes studied |
|---|---|---|---|
| 1 | Uncoated | −48.8 ± 2.5 | 3 |
| 2 | Uncoated | −38.9 ± 2.4 | 3 |
| 3 | Uncoated | −32.4 ± 0.4 | 2 |
| Few | Uncoated | −37.4 ± 8.2 | 3 |
| Graphite | Uncoated | −3 | 1 |
| 1 | Coated | −57.7 ± 7.8 | 4 |
| 2 | Coated | −53.9 ± 2.9 | 4 |
| 3 | Coated | −46.6 ± 9.0 | 6 |
| Few | Coated | −40.2 ± 14.2 | 7 |
| Graphite | Coated | 0 | 2 |

Table 1. Measured 2D Raman band shift rates (with standard deviations) for the uncoated and coated graphene nanocomposite specimens described in the Supporting Information (laser excitation 785 nm). All bands were fitted to a single Lorentzian peak and the number of flakes on which the measurements were made is indicated.

For the uncoated specimens in Table 1, it can be seen that there is a decrease in the band shift rate for the flakes as the number of layers increased from one to three. The shift rate data are more scattered for the multilayer flakes as it is impossible to know the exact number of layers in such flakes. The shift rate for a graphite flake on the same uncoated specimen is also very low. In contrast, the band shift rates are generally higher in the case of the coated specimen. The monolayer and bilayer flakes in the coated specimen have the same band shift rate within the limits of experimental error and the band shift rate then decreases for the three layer and multilayer flakes (again more scattered for the same reason as before). The shift rate for a graphite flake is again very low. The band shift behaviour shown in FIGS. 1 & 4 is completely consistent with the comprehensive set of data in Table 1.

At this stage it is worthwhile considering the observations of Procter et al (J. E. Procter, E. Gregoryanz, K. S. Novoselov, M. Lotya, J. N. Coleman, M. P. Halsall, *Physical Review B,* 2009, 80, 073408) who followed the shifts of the G and 2D bands of graphene, with different numbers of layers, supported uncoated upon the surface of 100 μm thick silicon wafers subjected to hydrostatic pressure. Since the thickness of the graphene was very much less than that of the silicon, the graphene followed the biaxial compression of the surface of the silicon wafer due to the pressurization, in the same way that it follows the axial deformation of the relatively large polymer beam in this present study. Procter et al found that the highest rate of band shift (per unit pressure) was for a graphene monolayer. This band shift rate for bilayer graphene on the silicon substrate was slightly lower than that of the monolayer, whereas the shift rate of their "few-layer" graphene was only half that of the monolayer material. It was suggested that this lower rate for few-layer material could be due to poor adhesion with the substrate. From the findings of this present study, however, it is likely that this lower band shift rate is due to the same phenomenon that leads to a lower band shift rates for the trilayer and few-layer graphene shown in Table 1.

It is well established that, to a first approximation, the slopes of the lines in FIGS. 1 and 4 can be related to the efficiency of stress transfer to the graphene. All the data have been obtained from the middle of the flakes, before any debonding or polymer fracture has occurred, and so any differences with respect to the monolayer will be a result of the efficiency of stress transfer between the different graphene layers. Since the shift of the 2D Raman band with strain, $d\omega_{2D}/d\varepsilon$ is proportional to the effective Young's modulus of the graphene and it follows that, if the polymer-graphene interface remains intact, the slopes of the lines in FIGS. 1 & 4*b* are an indication of the efficiency of internal stress transfer within the graphene layers. Consider, first of all, the situation with the coated and uncoated monolayer and bilayers in FIG. 1. The value of $d\omega_{2D}/d\varepsilon$ is similar in the coated and uncoated monolayer and also similar to that of the coated bilayer. In contrast $d\omega_{2D}/d\varepsilon$ is significantly lower for the uncoated bilayer, which implies poorer stress transfer through the bilayer. In this case, the efficiency of stress transfer, $k_b$ can be determined from $(d\omega_{2D}/d\varepsilon)_{Uncoated}$, the measured value of the slope for the uncoated specimen, using the following equation $$(d\omega_{2D}/d\varepsilon)_{Uncoated} = \frac{(d\omega_{2D}/d\varepsilon)_{Monolayer}}{[n_1 - k_i(n_1 - 1)]} \tag{1}$$

where $(d\omega_{2D}/d\varepsilon)_{Monolayer}$ is the slope measured for a graphene monolayer and nl is the number of layers.

The value of $k_i$ in this case is calculated to be about 0.3 when $(d\omega_{2D}/d\varepsilon)_{Coated}$ is used, rather than $(d\omega_{2D}/d\varepsilon)_{Monolayer}$, for the same bilayer in the same orientation after coating (see Table 1).

This analysis can be extended to the case of coated few-layer flakes where the equation is modified to give for $n_l>2$ $$(d\omega_{2D}/d\varepsilon)_{Coated} = \frac{(d\omega_{2D}/d\varepsilon)_{Monolayer}}{[n_1/2) - k_i((n_1/2) - 1)]} \tag{2}$$

where $(d\omega_{2D}/d\varepsilon)_{Coated}$ is the measured slope for the coated multi-layer region. The value of $(d\omega_{2D}/d\varepsilon)_{Coated}$ for the trilayer region is −44 cm$^{-1}$/% strain compared with $(d\omega_{2D}/d\varepsilon)_{Monolayer}$=−52 cm$^{-1}$/% strain on the same flake (FIG. 3*b*). Using equation (2) this leads to $k_i<0.6$ for stress transfer to the middle layer of the trilayer graphene. This is twice the value of $k_i$ determined for the uncoated bilayer. In the coated trilayer, however, there are two graphene-graphene interfaces with the middle layer and this should lead to better stress transfer and could account for the apparent differences in $k_i$ between the different specimens. The analysis can also be used to estimate the number of layer in the few-layer flake specimen for which $(d\omega_{2D}/d\varepsilon)_{Coated}$=−8 cm$^{-1}$/% strain. In this case, if the value of $k_i$ determined for the trilayer is employed, a value of $n_l<30$ is then obtained from equation (2). This analysis is rather simplistic in that more measurements of $k_i$ for multilayer flake to determined the variability in this parameter. Moreover, it is known that each layer of the graphene absorbs 2.3% of the light and so the Raman laser beam will only penetrate the outer layers of a multilayer flake. Hence the measured band shift for the few-layer flake comes primarily from layers near the surface and so the number of actual layers in the flake will be overestimated and is probably significantly less than 30.

It is worthwhile to consider the implications of these findings upon the design of graphene-based nanocomposites. If we take the parameter $(d\omega_{2D}/d\varepsilon)_{Measured}$ as an indication of the ability of the graphene to reinforce a polymer matrix then the first finding is that bilayer graphene will be equally as good as monolayer graphene. Moreover, only 15% of the reinforcing efficiency is lost with trilayer graphene. In fact, if $k_i$ is taken as 0.6, then it is only when $n_l>7$ that the reinforcing efficiency of the graphene falls to less than half of that of the monolayer material (see FIG. 7*a*).

As well as the number of layers in a graphene flake being important for reinforcement, it has already been established that lateral dimensions of the flake have a major effect as well. Mapping of strains across a monolayer flake combined with shear-lag analysis has revealed that when a flake is deformed in a nanocomposite the strain builds up from zero at the edges to be the same as that in the matrix in the centre of the flake, if the flake is large enough (typically >10 μm). Obtaining large exfoliated flakes in significant quantities remains something of a challenge. Because of this, the strain was mapped in the bilayer region over the flake shown in FIG. 3 at different levels of matrix strain, $\varepsilon_m$, using the strong 2D1A component of the bilayer 2D band, and the results are given in FIG. 5.

It can be seen that there is initially ($\varepsilon_m$=0.0%) a small amount of residual strain the bilayer graphene but that when $\varepsilon_m$ is increased to 0.4%, strain develops in the middle regions of the graphene bilayer, falling away at the edges. When the matrix strain is increased further, the distribution of strain in the graphene becomes less uniform and areas of both high and low strain develop in the middle regions of the flake.

The observation of the variation of strain across the flake at different strain levels gives further insight into the deformation process of the bilayer in the nanocomposite. FIG. 6 shows the variation of strain along row 2 (see FIG. 5) at different levels of matrix strain $\varepsilon_m$. Initially there appears to be a residual strain at the left-hand end of the flake, possibly as a result of the fabrication process and coating. At $\varepsilon_m$=0.4% the strain builds up to a plateau value of around 0.4% strain dipping down slightly in the middle of the flake. It then falls to zero at the right-hand end. The plots at $\varepsilon_m$=0.6% and 0.8% strain are similar to each other, showing two triangular distributions across the flake, with the strain falling to zero at either end and also in the middle of the flake. This behavior has been seen before for a large monolayer flake and was attributed to the development of cracks in the SU-8 polymer coating. Inspection of the map for $\varepsilon_m$=0.8% in FIG. 5 shows that similar large 'peaks' and deep 'valleys' have developed in the strain distribution for the graphene bilayer.

It is possible to estimate the shear stress at the graphene-polymer interface, $\tau_i$, from the slopes of the lines in FIG. 6 using the force balance equilibrium $$d\varepsilon_f/dx = -\tau_i/E_f t \tag{3}$$

where $\varepsilon_f$ is the strain in the flake at a position, x, $E_f$ is the modulus of the flake (~1000 GPa) and t is its thickness (<0.7 nm for the bilayer). Putting the measured slopes from FIG. 5 into this equation gives a value of interfacial shear stress that increases from 0.15 MPa at 0.4% matrix strain to around 0.3 MPa at 0.8% matrix strain.

The variation of strain across the flake in the direction of tensile straining was also determined along rows of data points along the top of the flake where there are regions of adjacent monolayer and bilayer material (see FIG. 3*b*). FIG. 7*a* shows the strain variation in the bilayer and monolayer regions along row 13 at 0.6% matrix strain. The graphene strain was determined using the monolayer and bilayer calibrations from FIG. 4*b* and the graphene structure along the row is also shown in the schematic diagram in FIG. 7. It can be seen that there is a continuous variation of graphene strain along the row. The data points in FIG. 6*a* were also fitted to shear lag theory using the equation $$\varepsilon_f=\varepsilon_m[1-(\cos h(ns(x/l))/\cos h(ns/2))] \quad (4)$$

where l is the length of the region being scanned across the flake and a value of ns, the fitting parameter of 10. The points all fall close to the theoretical line, giving further support to the observation that continuum mechanics is still applicable at the nano-scale. The parameter s is the aspect ratio of the flake equal to l/t, where t is the flake thickness. It may be significant that in a previous study that mapped strain along a graphene monolayer flake, the data could be fitted best to Equation 4 using a value of ns=20. This may be explained as bilayer graphene is twice the thickness of monolayer graphene and so the aspect ratio, s, will be halved for a flake of bilayer material of the same length, l. It should also be noted, however, that the value of n depends upon $t_{1/2}$ and so this needs to be taken into account as well.

The continuity of strain between monolayer and bilayer regions was investigated further and similar measurements were also undertaken along rows 11 and 12 (FIG. 4). FIG. 7*b* shows the correlation between the strain measured for adjacent points in rows 11-13 at a matrix strain of 0.6%. It can be seen that the data fall close to the line for uniform strain. This confirms the finding above that there is the same level of reinforcing efficiency for both monolayer and bilayer graphene.

At this stage it is worth considering the relative advantage of using bilayer graphene compared with the monolayer material. If we take two monolayer flakes dispersed well in a polymer matrix, the closest separation they can have will be of the order of the dimension of a polymer coil, i.e. at least several nm. In contrast the separation between the two atomic layers in bilayer graphene is only around 0.34 nm and so it will be easier to achieve higher loadings of the bilayer material in a polymer nanocomposite, leading to an improvement in reinforcement ability by up to a factor of two over the monolayer material.

It is possible to determine the optimum number of layers needed in the graphene flakes for the best levels of reinforcement in polymer-based nanocomposites. It was pointed out above that the effective Young's modulus of monolayer and bilayer graphene is similar and that it decreases as the number of layers decreases. In high volume fraction nanocomposites it will be necessary to accommodate the polymer coils between the graphene flake and the coil dimensions will limit the separation of the flakes. The minimum separation of the graphene flakes will depend upon the type of polymer (i.e. its chemical structure and molecular conformation) and its interaction with the graphene. It is unlikely that the minimum separation will be less than 1 nm and more likely that it will be several nm. The separation of the layers in multilayer graphene, on the other hand, is of the order of 0.34 nm. If a nanocomposite is assumed to be made up of parallel graphene flakes separated by thin polymer layer of the same uniform thickness, then it is possible to show that for a given polymer layer thickness, the maximum volume fraction of graphene in the nanocomposite will increase with the number of layers in the graphene, as shown in FIG. 9*a*. The Young's modulus, $E_c$, of such as nanocomposite can be determined using the simple "rule-of-mixtures" model such as $$E_c=E_{eff}V_g+E_mV_m \quad (5)$$

where $E_{eff}$ is the effective Young's modulus of the multilayer graphene, $E_m$ is the Young's modulus of the polymer matrix (<3 GPa), and $V_g$ and $V_m$ are the volume fractions of the graphene and matrix respectively ($V_g+V_m=1$). The maximum nanocomposite Young's modulus can be determined using this equation along with the data in FIG. 9*a* and is shown in FIG. 9*b* as a function of $n_l$ for polymer layers of different thickness. It can be seen that it peaks at $n_l$=3 for a polymer layer thickness of 1 nm and then decreases and the number of graphene layer in the flakes and polymer thickness increase. For a layer thickness of 4 nm the maximum nanocomposite Young's modulus is virtually constant for $n_l$>5. This analysis assumes that the graphene flakes are infinitely long but the maximum Young's modulus will be reduced for flakes of finite length because of shear-lag effects at the flake edge (FIG. 7*a*). The exact form of plots such as FIG. 9*b* and optimum value of $n_l$ will depend upon value of the stress transfer efficiency factor, $k_l$, but it serves as a useful design guide for graphene-based nanocomposites.

In other words, it has been widely shown that the G' (2D) band shift rate per unit strain in carbon systems is linearly proportional to the effective modulus of the material. The higher the shift rate, the higher the modulus of the carbon material. For example, a graphene flake with 500 GPa modulus will have half the shift rate of a 1000 GPa modulus flake. Therefore, a common method used to measure the modulus of a carbon material (e.g. fibre, nanotube or graphene) is to embed the material in a coating or composite. The Raman band position is then measured as a function of applied strain, with the strain in the composite being measured using a strain gauge and assumed to the same as that within the carbon material. The gradient of this band position versus strain plot is proportional to the modulus of the fibre (The proportionality constant used varies from ~50 to 60 $cm^{-1}$/% per 1 TPa modulus.) This technique is particularly successful for studying new materials as the modulus can be measured from a single particle, whereas a traditional tensile testing requires at least 1 g of material.

Herein, composites and coating were formed from flakes of graphene which varied from 1 ("monolayer"), 2 ("bilayer"), 3 ("trilayer") and 4 to 6 ("few") layers thick. The band shift rate per unit strain (e.g. modulus) for the monolayer was found to be independent of whether the surrounding polymer was on one side (i.e. the graphene was on top of a polymer film) or both sides (i.e. the graphene was embedded in a composite). However, the bilayer's shift rate (i.e. modulus) was found to be lower when only one side of the flake was in contact of the polymer compared when both sides were in contact. This difference shows the easy shear that occurs between the planes in bilayer graphene, reducing the modulus of the flakes when not all the graphene layers are in contact with the polymer. This easy shear nature was shown to reduce the modulus of graphene with increasing thickness when it was placed in a composite, with the modulus dropping going from bilayer to trilayer to few-layer (4-6 layers) to graphite (10's of layers thick). The first conclusion was to fit a simple model to these real experimental values, to predict the modulus of graphene as a function of layer thickness. This is shown in FIG. 8.

It would initially seem intuitive that in order to make a composite material with the highest possible modulus, one would use mono- or bi-layer graphene since they have the highest modulus. However, the degree of reinforcement a material gives to a composites is given by the modulus of the reinforcement multiplied by its volume fraction in the composite. Thus one needs to also consider the maximum achievable volume fraction that can be achieved as a function of graphene thickness. In order to illustrate this argument, we consider an ideal system made from graphene highly aligned surrounded by a polymer layer. (It should be noted that this is the maximum achievable volume fraction, and in a real system a lower volume fraction would be present, which will make few-layer flakes (4-6) even more favourable.)) The polymer-layer thickness will be approximately the radius of gyration of the polymer, which we take as either 1, 2 or 4 nm. Simple geometric calculations, then give the maximum achievable loading of the graphene as function of thickness and polymer layer thickness as shown in FIG. 9*a*.

Thus the maximum reinforcement of graphene as function of layer thickness is given by the multiplication of modulus by its filler fraction (FIG. 9*b*).

It has been demonstrated that although there is good stress transfer between a polymer matrix and monolayer graphene, monolayer graphene is not the optimum material to use for reinforcement in graphene-based polymer nanocomposites. There is also good stress transfer from the polymer matrix to the bilayer material and no slippage between the layers when it is fully encapsulated in a polymer matrix. Less efficient stress transfer has been found for trilayer and few-layer graphene due to slippage between the internal graphene layers, indicating that such materials will have a lower effective Young's modulus than either monolayer or bilayer graphene in polymer-based nanocomposites. However, since the inter-layer spacing in multi-layer graphene is only 0.34 nm and so an order of magnitude less than the dimensions of polymer coils, higher volume fractions of graphene can be obtained for multi-layer material. There is therefore a balance to be struck in the design of graphene-based nanocomposites between the ability to achieve higher loadings of reinforcement and the reduction in effective Young's modulus of the reinforcement, as the number of layers in the graphene is increased.

Materials and Methods

The specimen was prepared using a 5 mm thick poly (methyl methacrylate) beam spin-coated with 300 nm of cured SU-8 epoxy resin as described elsewhere (Gong, L.; Kinloch, I. A.; Young, R. J.; Riaz, I.; Jalil, R.; Novoselov, K. S. *Adv. Mater.,* 2010, 22, 2694-2697; Young, R. J.; Gong, L.; Kinloch, I. A.; Riaz, I.; Jalil R.; Novoselov, K. S., *ACS Nano,* 2011, 5, 3079-3084). The graphene was produced by mechanical cleaving of graphite and deposited on the surface of the SU-8 (A. C. Ferrari, J. C. Meyer, V. Scardaci, C. Casiraghi, M. Lazzeri, F. Mauri, S. Piscanec, D. Jiang, K. S. Novoselov, S. Roth, A. K. Geim, *Physical Review Letters,* 2006, 97, 187401; Malard, L. M.; Pimenta, M. A.; Dresselhaus, G.; Dresselhaus, M. S., *Phys. Rep.,* 2009, 473, 51-87). This method produced graphene with a range of different numbers of layers that were identified both optically and by using Raman spectroscopy. The PMMA beam was deformed in 4-point bending up to 0.4% strain with the strain monitored using a strain gage attached to the beam surface. Well-defined Raman spectra could be obtained from the graphene with different numbers of layers, using either a low-power (<1 mW at the sample) HeNe laser (1.96 eV) or near IR laser (1.58 eV) in Renishaw 1000 or 2000 spectrometers. The laser beam polarization was always parallel to the tensile axis and the spot size of the laser beam on the sample was approximately 2 μm using a 50× objective lens.

The beam was then unloaded and a thin 300 nm layer of SU-8 was then spin-coated on top and cured so that the graphene remained visible when sandwiched between the two coated polymer layers. The beam was reloaded initially up to 0.4% strain, and the deformation of the monolayer and bilayer graphene on same flake on the surface of the beam was again followed from the shift of the 2D (or G') Raman band. The beam was then unloaded and then reloaded to various other levels of strain and the shift of a trilayer region on the same flake and a few-layer graphene flake was also followed from the shift of the 2D (or G') Raman band.

The strains in the graphene flake containing both monolayer and bilayer regions were mapped fully at each strain level as well as in the unloaded state. Raman spectra were obtained at different strain levels through mapping over the graphene monolayer in steps of between 2 μm and 5 μm by moving the x-y stage of the microscope manually and checking the position of the laser spot on the specimen relative to the image of the monolayer on the screen of the microscope. The strain at each measurement point was determined from the position of the 2D Raman band using the calibrations in FIG. 1 and strain maps of the bilayer were produced in the form of colored x-y contour maps using the OriginPro 8.1 graph-plotting software package, which interpolates the strain between the measurement points. One-dimensional plots of the variation of strain across the flake were also plotted along the rows indicated in FIG. 5, at different levels of matrix strain.

EXAMPLE 2

$MoS_2$ Composites $MoS_2$ composites were made in a similar method to the graphene samples; bulk $MoS_2$ materials were exfoliated to a monolayer or few layer (i.e. approximately 4-6 layers) samples by the use of sellotape. These samples were then transferred to a polymer beam and coated with a polymer top layer to make a composite. The samples were deformed and the peak position of the $A_{1g}$ and $E^1{}_{2g}$ Raman bands recorded as a function of strain. As with the graphene samples, the higher the gradient on the strain-band position graph (i.e. shift per strain), the higher the effective modulus of the $MoS_2$ flake. For both bands, the shift rate was higher for the monolayer flakes than the few layer flake (FIG. 10); for $A_{1G}$ band, the shift rate for the monolayer is $-0.4\ cm^{-1}/\%$ and few $-0.3\ cm^{-1}/\%$ and for the $E^1{}_{2G}$ band the shift rate for the monolayer is $-2.1\ cm^{-1}/\%$ and few $-1.7\ cm^{-1}/\%$.

The invention claimed is:

1. A composite material comprising:

a polymer matrix comprising a polymer selected from the group consisting of epoxy, polyester, and polyurethane; and a filler embedded within the polymer matrix, the filler comprising a layered, inorganic two-dimensional material with an in-plane modulus significantly higher than the shear modulus between the layers; wherein the filler is selected from the group consisting of graphene, functionalised graphene that is not graphene oxide, and a mixture of graphene and functionalised graphene; and wherein the filler material is dispersed within the matrix; and wherein the filler material comprises a plurality of individual filler fragments in which the thickness of the filler fragments is such that at least 50% by weight of the filler has a thickness of between 3 layers and 6 layers; and wherein the filler is present in a plurality of thicknesses such that the filler is not 100% by weight a single thickness.

2. A composite material comprising:

a polymer matrix comprising a polymer selected from the group consisting of epoxy, polyester, and polyurethane; and a filler embedded within the polymer matrix, the filler comprising a layered, inorganic two-dimensional material with an in-plane modulus significantly higher than the shear modulus between the layers; wherein the filler is selected from the group consisting of graphene, functionalised graphene that is not graphene oxide, and a mixture of graphene and functionalised graphene; and wherein the filler material is dispersed within the matrix; wherein the filler material comprises a plurality of individual filler fragments; wherein the volume loading of the filler in the matrix is at least 0.1 vol % of the composite material; and wherein the thickness of the filler fragments is such that at least 50% by weight of the filler has a thickness of between 3 layers and 6 layers.

3. A composite material comprising:

a polymer matrix comprising a polymer selected from the group consisting of epoxy, polyester, and polyurethane; and a filler embedded within the polymer matrix, the filler comprising a layered, inorganic two-dimensional material with an in-plane modulus significantly higher than the shear modulus between the layers;

wherein the filler material is dispersed within the matrix; wherein the filler is selected from the group consisting of graphene, functionalised graphene that is not graphene oxide, and a mixture of graphene and functionalised graphene; wherein the filler material comprises a plurality of individual filler fragments in which the average thickness of the filler taken as a whole is between 3.5 layers and 7 layers; wherein the thickness of the filler fragments is such that at least 50% by weight of the filler has a thickness of between 3 layers and 6 layers; and wherein the filler is present in a plurality of thicknesses such that the filler is not 100% by weight a single thickness.

4. The composite material according to any one of claims 1-3, wherein the filler is graphene.

5. A method of preparing a composite, the method comprising the steps of:

providing a plurality of individual filler fragments; wherein the thickness of the filler fragments is such that at least 50% by weight of the filler has a thickness of between 3 layers and 6 layers; and admixing the filler fragments with a polymer matrix-forming material selected to form a polymer matrix comprising a polymer selected from the group consisting of epoxy, polyester, and polyurethane to produce a dispersion of filler in the polymer matrix and optionally curing the matrix forming material; and wherein the filler is selected from the group consisting of graphene, functionalised graphene that is not graphene oxide, and a mixture of graphene and functionalised graphene; and wherein the filler is embedded within the matrix and present in a plurality of thicknesses such that the filler is not 100% by weight a single thickness.

6. A material comprising a plurality of individual graphene fragments as a filler embedded in a polymer matrix wherein the graphene has an average thickness of between 3.5 graphene layers and 7 graphene layers, wherein the thickness of the individual graphene fragments is such that at least 50% by weight of the graphene has a thickness between 3 layers and 6 layers; wherein the graphene fragments comprise graphene, functionalised graphene that is not graphene oxide, or a mixture of graphene and functionalised graphene; and wherein the polymer matrix comprises a polymer selected from the group consisting of epoxy, polyester, and polyurethane.

7. A method of improving one or more of the mechanical properties selected from the group consisting of: the strength, modulus, wear resistance, and hardness, of a matrix, comprising incorporating a filler into the matrix to form a composite material, wherein at least one of the mechanical properties is improved relative to that of the matrix or substrate, and wherein the filler comprises a plurality of individual fragments having an average thickness of between 3.5 layers and 7 layers, and wherein the thickness of the individual filler fragments is such that at least 50% by weight of the filler has a thickness between 3 layers and 6 layers;

wherein the filler is embedded within the matrix and is present in a plurality of thicknesses such that the filler is not 100% by weight a single thickness; and wherein the filler is selected from the group consisting of graphene, functionalised graphene that is not graphene oxide, and a mixture of graphene and functionalised graphene; and wherein the polymer matrix comprises a polymer selected from the group consisting of epoxy, polyester, and polyurethane.

8. A composite material according to claim 4, wherein the filler is pristine graphene which has not been previously chemically modified.

9. A composite material according to any one of claims 1 to 3, wherein the filler is functionalised graphene that is not graphene oxide.

10. A composite material according to claim 9, wherein the filler is graphene which is functionalised with halogen.

11. A composite material according to claim 1, wherein the polymer matrix comprises epoxy.

12. A composite material according to claim 2, wherein the polymer matrix comprises epoxy.

13. A composite material according to claim 3, wherein the polymer matrix comprises epoxy.

14. A composite material according to claim 6, wherein the polymer matrix comprises epoxy.

* * * * *